US010020487B2

(12) United States Patent
Fan

(10) Patent No.: US 10,020,487 B2
(45) Date of Patent: Jul. 10, 2018

(54) RECHARGEABLE BATTERY WITH VOLTAGE ACTIVATED CURRENT INTERRUPTER

(71) Applicant: American Lithium Energy Corporation, Vista, CA (US)

(72) Inventor: Jiang Fan, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 117 days.

(21) Appl. No.: 14/952,762

(22) Filed: Nov. 25, 2015

(65) Prior Publication Data
US 2016/0149199 A1     May 26, 2016

Related U.S. Application Data

(60) Provisional application No. 62/114,508, filed on Feb. 10, 2015, provisional application No. 62/114,007, (Continued)

(51) Int. Cl.
*H01M 2/34* (2006.01)
*H01M 10/0525* (2010.01)
(Continued)

(52) U.S. Cl.
CPC ......... *H01M 2/34* (2013.01); *H01M 10/0525* (2013.01); *H01M 4/13* (2013.01); *H01M 4/366* (2013.01); *H01M 2200/00* (2013.01)

(58) Field of Classification Search
CPC ......... H01M 10/0525; H01M 10/4235; H01M 2/348; H01M 4/13; H01M 4/366; H01M 4/628
See application file for complete search history.

(56) References Cited

U.S. PATENT DOCUMENTS 4,075,400 A    2/1978 Fritts
5,504,128 A    4/1996 Mizutani et al.
(Continued)

FOREIGN PATENT DOCUMENTS

EP    0450549 A1    10/1991
EP    0776058 A2    5/1997
(Continued)

OTHER PUBLICATIONS

Eichstadt, Amy E., et al. "Structure-Property Relationships for a Series of Amorphous Partially Aliphatic Polyimides." *Journal of Polymer Science Part B: Polymer Physics* 40.14 (2002): 1503-1512.
(Continued)

*Primary Examiner* — Ula C Ruddock
*Assistant Examiner* — Ben Lewis
(74) *Attorney, Agent, or Firm* — Mintz Levin Cohn Ferris Glovsky and Popeo, P.C.

(57) ABSTRACT

A high energy density rechargeable metal-ion battery includes an anode energy layer, a cathode energy layer, a separator for separating the anode and the cathode energy layers, an anode current collector for transferring electrons to and from the anode energy layer, the battery characterized by a maximum safe voltage for avoiding overcharge, and an interrupt layer that interrupts current within the battery upon exposure to voltage in excess of the maximum safe voltage. The interrupt layer is between the anode energy layer and current collector. When unactivated, it is laminated to the cathode current collector, conducting current therethrough. When activated, the interrupt layer delaminates from the anode current collector, interrupting current therethrough. The interrupt layer includes a voltage sensitive decomposable component that upon exposure to voltage in excess of the maximum safe voltage decomposes, evolving a gas, (Continued)

delaminating the interrupt layer from the anode current collector, interrupting current therethrough.

17 Claims, 18 Drawing Sheets

Related U.S. Application Data filed on Feb. 9, 2015, provisional application No. 62/084,454, filed on Nov. 25, 2014.

(51) Int. Cl.
*H01M 4/36* (2006.01)
*H01M 4/13* (2010.01)

(56) References Cited

U.S. PATENT DOCUMENTS

| | | | |
|---|---|---|---|
| 6,387,570 B1 | 5/2002 | Nakamura et al. | |
| 6,576,373 B1 | 6/2003 | Iwamoto et al. | |
| 6,780,544 B2 | 8/2004 | Noh | |
| 8,021,788 B2 | 9/2011 | Kim et al. | |
| 9,627,722 B1 | 4/2017 | Fan et al. | |
| 2005/0079422 A1 | 4/2005 | Ko et al. | |
| 2006/0099506 A1 | 5/2006 | Krause et al. | |
| 2007/0166609 A1 | 7/2007 | Lee et al. | |
| 2007/0269718 A1 | 11/2007 | Krause et al. | |
| 2008/0116423 A1 | 5/2008 | Fan et al. | |
| 2008/0241684 A1* | 10/2008 | Muraoka | H01M 2/16 429/209 |
| 2008/0254343 A1 | 10/2008 | Kaplin et al. | |
| 2008/0292939 A1 | 11/2008 | Xie | |
| 2010/0167107 A1 | 7/2010 | Byun et al. | |
| 2011/0045321 A1 | 2/2011 | Park et al. | |
| 2012/0056709 A1 | 3/2012 | Kajino et al. | |
| 2012/0068127 A1 | 3/2012 | Kawase et al. | |
| 2013/0101869 A1 | 4/2013 | Farmer | |
| 2013/0130075 A1 | 5/2013 | Kim et al. | |
| 2016/0149196 A1 | 5/2016 | Fan et al. | |
| 2016/0149268 A1 | 5/2016 | Fan et al. | |
| 2016/0149269 A1 | 5/2016 | Fan et al. | |
| 2016/0181590 A1 | 6/2016 | Fan et al. | |

FOREIGN PATENT DOCUMENTS

| | | | |
|---|---|---|---|
| EP | 1246280 A2 | 10/2002 | |
| JP | 7220755 A2 | 8/1995 | |
| JP | 09-320568 | * 12/1997 | ............... H01M 2/34 |
| JP | H09 320568 A | 12/1997 | |
| KR | 20130123492 A | 11/2013 | |
| WO | WO-2004/049494 A1 | 6/2004 | |

OTHER PUBLICATIONS

Fang, Xingzhong, et al. "Synthesis and properties of polyimides derived from cis-and trans-1, 2, 3, 4-cyclohexanetetracarboxylic dianhydrides." *Polymer* 45.8 (2004): 2539-2549.
International Search Report and Written Opinion issued in International Application No. PCT/US2015/062767, dated Feb. 12, 2016.
Jeon, Jong-Young, and Tae-Moon Tak. "Synthesis of Aliphatic-Aromatic Polyimides by Two-Step Polymerization of Aliphatic Dianhydride and Aromatic Diamine." *Journal of Applied Polymer Science* 60.11 (1996): 1921-1926.
Loncrini, D. F., and J. M. Witzel. "Polyaryleneimides of meso-and dl-1, 2, 3, 4-Butanetetracarboxylic Acid Dianhydrides." *Journal of Polymer Science Part A 1: Polymer Chemistry* 7.8 (1969): 2185-2193.
Matsumoto, Toshihiko. "Aliphatic polyimides derived from polyalicyclic monomers." *High Performance Polymers* 13.2 (2001): S85-S92.
Schab-Balcerzak, E., et al. "Synthesis and characterization of organosoluble aliphatic-aromatic copolyimides based on cycloaliphatic dianhydride." *European Polymer Journal* 38.3 (2002): 423-430.
Seino, Hiroshi, Amane Mochizuki, and Mitsuru Ueda. "Synthesis of Aliphatic Polyimides Containing Adamantyl Units." *Journal of Polymer Science Part A Polymer Chemistry* 37.18 (1999): 3584-3590.
Seino, Hiroshi, et al. "Synthesis of fully aliphatic polyimides." *High Performance Polymers* 11.3 (1999): 255-262.
Spotnitz, R., and J. Franklin. "Abuse behavior of high-power, lithium-ion cells." *Journal of Power Sources* 113.1 (2003): 81-100.

* cited by examiner

Prior Art - Unshorted

Prior Art - Shorted

Unshorted

Shorted

| Cell # | Positive Electrode | Negative Electrode | Comments |
|---|---|---|---|
| 1 | POS1A:<br>$LiNi_{0.5}Mn_{0.3}Co_{0.2}O_2$: 93.4%;<br>Carbon black: 3%;<br>PVDF: 3.6%;<br>Loading: 15.55 mg/cm$^2$;<br>Thickness: 117 μm. | NEG1A:<br>SLP 30: 18.272%;<br>MCMB: 75.728%;<br>Carbon black: 2%;<br>CMC: 1.5%;<br>SBR: 2.5%;<br>Loading: 9.14 mg/cm$^2$;<br>Thickness: 117 μm. | Baseline; no protection layer |
| 2 | POS2A:<br>$Li_{1+x}Ni_{0.33}Co_{0.33}Mn_{0.33}O_2$: 95.3%<br>Carbon black: 1.5%;<br>PVDF: 3%;<br>Dispersing agent: 0.2%;<br>Loading: 15.92 mg/cm$^2$;<br>Thickness: 123 μm. | NEG2A:<br>SLP 30: 18.872%;<br>MCMB: 75.728%;<br>Carbon black: 2%;<br>CMC: 1.3%;<br>SBR: 2.1%;<br>Loading: 8.54 mg/cm$^2$;<br>Thickness: 118 μm. | Baseline; no protection layer; resistance measurement for positive POS2A at 3.6V vs graphite |
| 3 | POS3B: 1$^{st}$ layer<br>$CaCO_3$: 85.2%;<br>Carbon black: 0.8%;<br>TF-4000: 2%;<br>PVDF: 12%;<br>1$^{st}$ Layer Loading: 1 mg/cm$^2$;<br>1$^{st}$ Layer Thickness: ~10 μm.<br><br>POS3A: 2$^{nd}$ layer<br>$LiNi_{0.33}Mn_{0.33}Co_{0.33}O_2$ 93.4%;<br>Carbon black: 3%;<br>PVDF: 3.6%.<br><br>Total electrode (two layers):<br>Loading: 19.4 mg/cm$^2$;<br>Thickness: ~148 μm. | NEG3A:<br>SLP 30: 18.872%;<br>MCMB: 75.728%;<br>Carbon black: 2%;<br>CMC: 1.3%;<br>SBR: 2.1%;<br>Loading: 11.8 mg/cm$^2$;<br>Thickness: 159 μm. | Gas generating layer coated on positive electrode. |
| 4 | POS4B: 1$^{st}$ layer<br>$Al_2O_3$: 42.6%;<br>$CaCO_3$: 42.6%;<br>Carbon black: 0.8%;<br>TF-4000: 2%;<br>PVDF: 12%;<br>1$^{st}$ Layer Loading: 1 mg/cm$^2$;<br>1$^{st}$ Layer Thickness: 10 μm.<br><br>POS4A: 2$^{nd}$ layer<br>$LiNi_{0.5}Mn_{0.3}Co_{0.2}O_2$: 93.4%;<br>Carbon black: 3%;<br>PVDF: 3.6%.<br><br>Total electrode (two layers):<br>Loading: 19.4 mg/cm$^2$;<br>Thickness: ~153 μm. | NEG4A:<br>SLP 30: 18.872%;<br>MCMB: 75.728%;<br>Carbon black: 2%;<br>CMC: 1.3%;<br>SBR: 2.1%;<br>Loading: 11.8 mg/cm$^2$;<br>Thickness: 159 μm. | Resistance and gas generating layer coated on positive electrode. |

FIG. 5A

| 5 | POS5B: 1st layer
Al$_2$O$_3$: 42.6%;
Na$_2$O$_7$Si$_3$: 42.6%;
Carbon black: 0.8%;
TF-4000: 2%;
PVDF: 12%;
1st Layer Loading: 0.7 mg/cm$^2$;
1st Layer Thickness: 10 μm.

POS5A: 2nd layer
LiNi$_{0.33}$Mn$_{0.33}$Co$_{0.33}$O$_2$: 95%;
Carbon black: 1.5%;
PVDF: 3.5%;

Total electrode (two layers):
Loading: 19.5 mg/cm$^2$;
Thickness: ~150 μm. | NEG5A:
SLP 30: 18.872%;
MCMB: 75.728%;
Carbon black: 2%;
CMC: 1.3%;
SBR: 2.1%;

Loading: 11.8 mg/cm$^2$;
Thickness: 159 μm. | Resistance and gas generating layer coated on positive electrode. (Na$_2$O$_7$Si$_3$ will absorb the water during the processing in the air and decompose into quartz, sodium disilicate, and liquid) |
|---|---|---|---|
| 6 | POS6B: 1st layer
CaCO$_3$: 49.8%;
Carbon black: 3.7%;
PVDF: 46.5%;
1st Layer Loading: 1 mg/cm$^2$;
1st Layer Thickness: ~10 μm.

POS6A: 2nd layer
LiNi$_{0.33}$Mn$_{0.33}$Co$_{0.33}$O$_2$: 93%;
Carbon black: 3%;
PVDF: 4%.

Total electrode (two layers):
Loading: 22 mg/cm$^2$;
Thickness: ~167 μm. | NEG6A:
MCMB: 94%;
Carbon black: 2%;
CMC: 1.5%;
SBR: 2.5%;

Loading: 12 mg/cm$^2$;
Thickness: 170 μm. | Gas generating layer coated on positive electrode. |
| 7 | POS071A: 1st layer
LiNi$_{0.33}$Mn$_{0.33}$Co$_{0.33}$O$_2$: 89.96%;
CaCO$_3$: 4.74%;
carbon black: 1.2%;
TF-4000: 0.6%;
PVDF: 3.5%;
1st Layer Loading: 4 mg/cm$^2$;
1st Layer Thickness: ~0.04 mm

POS071B: 2nd layer
LiNi$_{0.82}$Al$_{0.03}$Co$_{0.15}$O$_2$: 92.8%;
Carbon black: 3%;
PVDF A: 3.6%;
TF-4000: 0.6%;
Total electrode (two layers):
Loading: 16 mg/cm$^2$;
Thickness: ~0.105 mm | NEG015B:
MCMB: 94.5%
Carbon black: 1.5%
CMC: 1.5%
SBR: 2.5%
Loading: ~11.8mg/cm$^2$
Thickness: ~0.155 mm | The first layer, the gas generator contains the gas generator CaCO$_3$ and active LiNi$_{0.33}$Mn$_{0.33}$Co$_{0.33}$O$_2$, which will maximize the battery cell capacity |

FIG. 5B

| Electrode ID | Materials | (%) | (g) | Comments |
|---|---|---|---|---|
| POS7B | Carbopol®-934 | 98.2 | 19.64 | Polymer with $CO_3^{2-}$ anion. |
| | Super-P® | 0.8 | 0.16 | |
| | LiOH | 1 | 0.2 | |
| POS8B | AI-50 | 99.2 | 19.84 | Polymer containing carbonyl group and $NH_2$ group which may decompose into $CO_2$. |
| | Super-P® | 0.8 | 0.16 | |
| POS9B | CMC-DN-800H | 99.2 | 19.84 | Polymer containing carboxylic acid groups with $NH_4$ cations |
| | Super-P® | 0.8 | 0.16 | |
| POS10B | $ZnCO_3 \cdot Zn(OH)_2$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS11B | $Na_2SO_3$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS12B | $CuCO_3 \cdot Cu(OH)_2$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS13B | $La_2(CO_3)_3$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS14B | $Cu(NO_3)_2$ | 85.2 | 17.04 | Salt |
| | Super-P® | 0.8 | 0.16 | |
| | Torlon® 4000TF | 12 | 2.4 | |
| | PVDF-A | 0.1 | 0.02 | |

FIG. 6

| Cell # | Impedance (mohm) | Cap. at 1A (Ah) | Cap. at 3A (Ah) | Cap. at 6A (Ah) | Cap. at 10A (Ah) | Ratio (Cap. at 3 A/Cap. At 1A) | Ratio (Cap. at 6 A/Cap. at 1A) | Ratio (Cap. at 10 A/Cap. at 1 A) |
|---|---|---|---|---|---|---|---|---|
| 1 | 14 | 2.32 | 2.24 | 2.13 | 1.93 | 0.97 | 0.95 | 0.91 |
| 3 | 51.6 | 2.3687 | 2.104 | 1.64 | 0.94 | 0.89 | 0.78 | 0.57 |
| 4 | 46.8 | 2.3809 | 2.2607 | 1.8414 | 1.0256 | 0.95 | 0.81 | 0.56 |
| 5 | 16.5 | 2.4168 | 2.3792 | 2.3 | 2.06 | 0.98 | 0.97 | 0.9 |
| 6 | 15.8 | 2.3383 | 2.2495 | 2.1446 | 1.967 | 0.96 | 0.95 | 0.92 |

| Cell # | Maximum Cell Temperature/°C | Comments |
|---|---|---|
| 1 | 334 | fire and explosion |
| 3 | 80 | pass |
| 4 | 84 | pass |
| 5 | 90 | pass |
| 6 | 84 | pass |

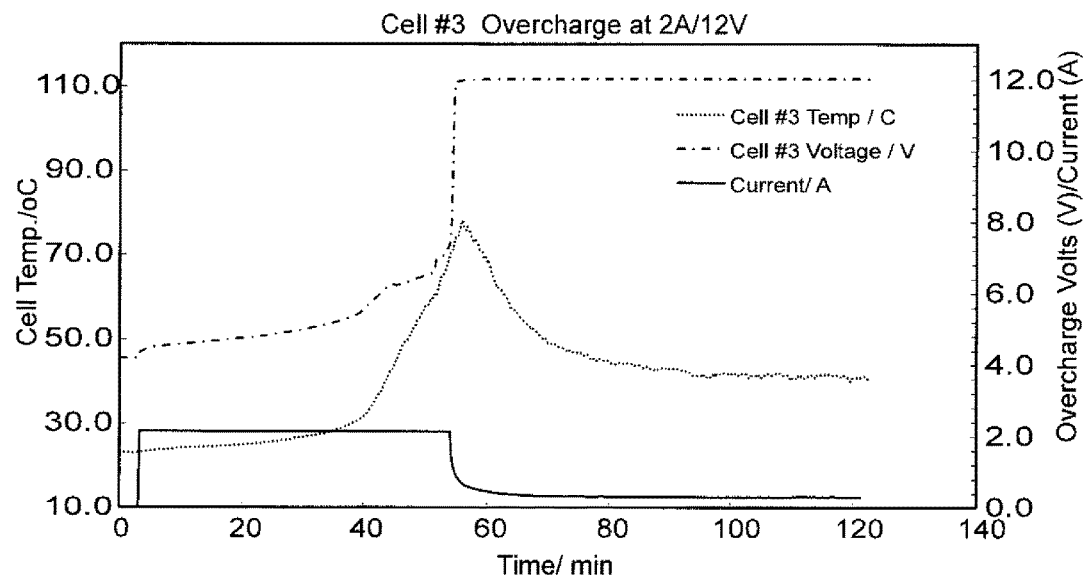
FIG. 18
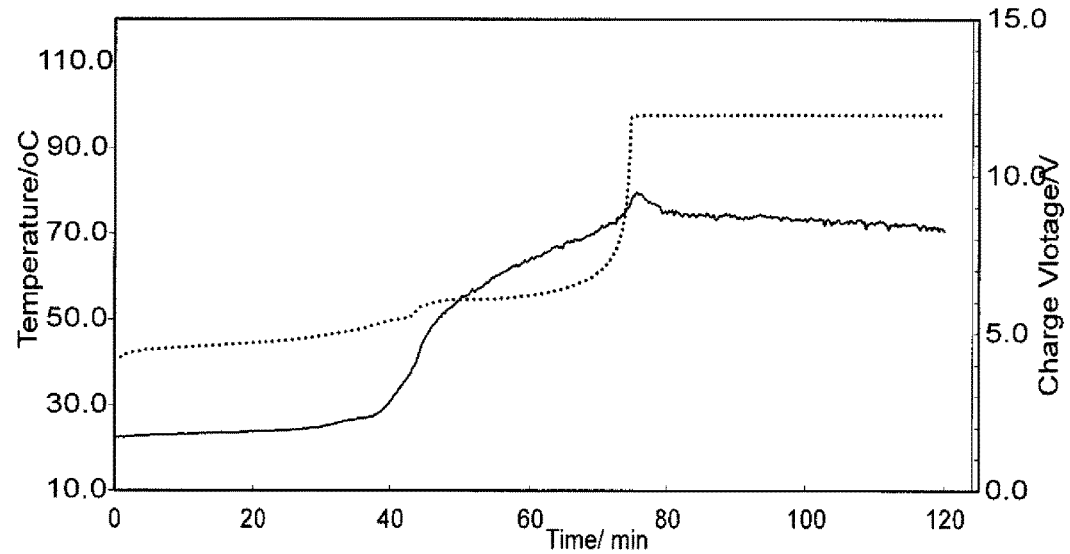
FIG. 19
| Cell # | Maximum Cell Temperature/°C | Comments |
|---|---|---|
| 1 | 680 | fire and explosion |
| 3 | 80 | pass |
| 4 | 80 | pass |
| 5 | 75 | pass |
| 6 | 80 | pass |
FIG. 20

| Compounds | Peak current/mA | Peak voltage/V |
|---|---|---|
| $CaCO_3$ | 0.2 | >6 |
| $La_2(CO_3)_3$ | 0.2 | >6 |
| $Na_2SO_3$ | 0.48 | 5.84 |
| $ZnCO_3Zn(OH)_2$ | 0.77 | 5.89 |
| $CuCO_3Cu(OH)_2$ | 0.78 | 5.78 |
| $Cu(NO_3)_2$ | 1 | 5.8 |

| Polymers | Peak current/mA | Peak voltage/V |
|---|---|---|
| Carbopol | 0.94 | 4.95 |
| Al-50 | 0.96 | 5.88 |
| CMC | 0.4 | >6 |
| PVDF | 1.178 | 5.38 |

RECHARGEABLE BATTERY WITH VOLTAGE ACTIVATED CURRENT INTERRUPTER

CROSS-REFERENCE TO RELATED APPLICATIONS

This application claims priority under 35 U.S.C. § 119 (e) to the following three Provisional Applications: U.S. Provisional Application No. 62/084,454, filed Nov. 25, 2014, titled "Battery Safety Device;" U.S. Provisional Application No. 62/114,007, filed Feb. 9, 2015, titled "Rechargeable Battery with Voltage Activated Current Interrupter;" and U.S. Provisional Application No. 62/114,508, filed Feb. 10, 2015, titled "Rechargeable Battery with Internal Current Limiter and Interrupter," the disclosures of which are all hereby incorporate by reference herein, each in its entirety.

BACKGROUND

Technical Field

This disclosure relates to an internal current limiter or current interrupter used to protect a battery in the event of an internal short circuit or overcharge leads to thermal runaway. In particular, it relates to a high energy density rechargeable (HEDR) battery with improved safety.

Background

There is a need for rechargeable battery systems with enhanced safety which have a high energy density and hence are capable of storing and delivering large amounts of electrical energy per unit volume and/or weight. Such stable high energy battery systems have significant utility in a number of applications including military equipment, communication equipment, and robotics.

An example of a high energy density rechargeable (HEDR) battery commonly in use is the lithium-ion battery. A lithium-ion battery is a rechargeable battery wherein lithium ions move from the negative electrode to the positive electrode during discharge and back when charging. Lithium-ion batteries can be dangerous under some conditions and can pose a safety hazard. The fire energy content (electrical+chemical) of lithium cobalt-oxide cells is about 100 to 150 kJ per A h, most of it chemical. If overcharged or overheated, Li-ion batteries may suffer thermal runaway and cell rupture. In extreme cases this can lead to combustion. Also, short-circuiting the battery, either externally or internally, will cause the battery to overheat and possibly to catch fire.

Thermal Runaway:

If the heat generated by a lithium ion battery exceeds its heat dissipation capacity, the battery can become susceptible to thermal runaway, resulting in overheating and, under some circumstances, to destructive results such as fire or violent explosion. Thermal runaway is a positive feedback loop wherein an increase in temperature changes the system so as to cause further increases in temperature. The excess heat can result from battery mismanagement, battery defect, accident, or other causes. However, the excess heat generation often results from increased joule heating due to excessive internal current or from exothermic reactions between the positive and negative electrodes. Excessive internal current can result from a variety of causes, but a lowering of the internal resistance due to separator short circuit is one possible cause. Heat resulting from a separator short circuit can cause a further breach within the separator, leading to a mixing of the reagents of the negative and positive electrodes and the generation of further heat due to the resultant exothermic reaction.

Internal Short Circuit:

Lithium ion batteries employ a separator between the negative and positive electrodes to electrically separate the two electrodes from one another while allowing lithium ions to pass through. When the battery performs work by passing electrons through an external circuit, the permeability of the separator to lithium ions enables the battery to close the circuit. Short circuiting the separator by providing a conductive path across it allows the battery to discharge rapidly. A short circuit across the separator can result from improper charging and discharging. More particularly, improper charging and discharging can lead to the deposition of a metallic lithium dendrite within the separator so as to provide a conductive path for electrons from one electrode to the other. The lower resistance of this conductive path allows for rapid discharge and the generation of significant joule heat. Overheating and thermal runaway can result.

Overcharge:

In a lithium-ion battery, useful work is performed when electrons flow through a closed external circuit. However, in order to maintain charge neutrality, for each electron that flows through the external circuit, there must be a corresponding lithium ion that is transported from one electrode to the other. The electric potential driving this transport is achieved by oxidizing a transition metal. For example, cobalt (Co), from $Co^{3+}$ to $Co^{4+}$ during charge and reduced from $Co4^{4+}$ to $Co^{3+}$ during discharge. Conventionally, $Li_{1-x}CoO_2$ may be employed, where the coefficient $\chi$ represents the molar fraction of both the Li ion and the oxidative state of $CoO_2$, viz., $Co^{3+}$ or $Co^{4+}$. Employing these conventions, the positive electrode half-reaction for the lithium cobalt battery is represented as follows:

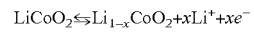
$$LiCoO_2 \leftrightharpoons Li_{1-x}CoO_2 + xLi^+ + xe^-$$

The negative electrode half reaction is represented as follows:

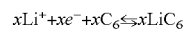
$$xLi^+ + xe^- + xC_6 \leftrightharpoons xLiC_6$$

The cobalt electrode reaction is reversible only for x<0.5, limiting the depth of discharge allowable. Overcharge leads to the synthesis of cobalt (IV) oxide, as follows:

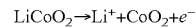
$$LiCoO_2 \rightarrow Li^+ + CoO_2 + e^-$$

Overcharge is irreversible and can lead to thermal runaway.

What was needed was an internal battery feature for preventing overcharge. What was needed was an internal current limiter that could limit the rate of internal discharge resulting from an internal short circuit, including a short circuit of the separator.

SUMMARY

Provided in some implementations herein is a high energy density rechargeable (HEDR) metal-ion battery that includes an anode energy layer, a cathode energy layer, a separator for separating the anode energy layer from the cathode energy layer, an anode current collector for transferring electrons to and from the anode energy layer, the high energy density rechargeable metal-ion battery being rechargeable and characterized by a maximum safe voltage for avoiding overcharge; and an interrupt layer activatable for interrupting current within the high energy density rechargeable battery upon exposure to voltage in excess of the maximum safe voltage, the interrupt layer sandwiched between the cathode energy layer and the cathode current collector, the interrupt layer, when unactivated, being laminated to the anode current collector for conducting current therethrough, the interrupt layer, when activated, being delaminated from the anode current collector for interrupting current therethrough, the interrupt layer including a voltage sensitive decomposable component for decomposing upon exposure to voltage in excess of the maximum safe voltage, the voltage sensitive decomposable component for evolving a gas upon decomposition, the evolved gas for delaminating the interrupt layer from the anode current collector for interrupting current therethrough, whereby the high energy density rechargeable metal-ion battery avoids overcharge by activation of the interrupt layer upon exposure to voltage in excess of the maximum safe voltage for interrupting current therethough.

The following features can be present in the high energy density rechargeable metal-ion battery in any suitable combination. The interrupt layer of the HEDR battery can be porous and have a composition that includes a ceramic powder defining an interstitial space; a binder for partially filling the interstitial space for binding the ceramic powder; and a conductive component dispersed within the binder for imparting conductivity to the interrupt layer, the interstitial space remaining partially unfilled for imparting porosity and permeability to the interrupt layer. The interrupt layer can be compacted for reducing the unfilled interstitial space and increasing the binding of the ceramic powder by the binder. The interrupt layer can include greater than 30% ceramic powder by weight. The interrupt layer can include greater than 50% ceramic powder by weight. The interrupt layer can include greater than 70% ceramic powder by weight. The interrupt layer can include greater than 75% ceramic powder by weight. The interrupt layer can include greater than 80% ceramic powder by weight. The interrupt layer can be permeable for transporting ionic charge carriers. The interrupt layer of the HEDR battery can be non-porous and have a composition that includes a non-conductive filler; a binder for binding the non-conductive filler; and a conductive component dispersed within the binder for imparting conductivity to the interrupt layer. The interrupt layer can be impermeable to transport of ionic charge carriers. The interrupt layer can be sacrificial at voltages above the maximum safe voltage for recharging. The interrupt layer can include a ceramic powder that chemically decomposes above maximum safe voltage for evolving the gas. The gas can be fire retardant.

In a related aspect, provided herein is a method for interrupting a recharging process for a high energy density rechargeable metal-ion battery upon exposure to voltage at or above a maximum safe voltage for avoiding overcharge, the high energy density rechargeable metal-ion battery comprising an anode energy layer, a cathode energy layer, a separator between the anode energy layer and the cathode energy layer, and an anode current collector for transferring electrons to and from the anode energy layer. The method includes overcharging the high energy density rechargeable metal-ion battery for increasing the voltage above the maximum safe voltage for recharging; and interrupting the overcharging by evolving a gas by decomposition of a voltage sensitive decomposable component within a interrupt layer laminated to the anode current collector, the evolved gas delaminating the interrupt layer from the anode current collector, whereby the overcharging of the high energy density rechargeable metal-ion battery is interrupted by evolution of gas within the interrupt layer for delaminating the interrupt layer from the anode current collector.

In some implementations of the described subject matter, provided herein is a high energy density rechargeable metal-ion battery of a type that includes an anode energy layer, a cathode energy layer, a separator for separating the anode energy layer from the cathode energy layer, and an anode current collector for transferring electrons to and from the anode energy layer. The high energy density rechargeable metal-ion battery is rechargeable and characterized by a maximum safe voltage for avoiding overcharge. The improvement comprises an interrupt layer activatable for interrupting current within the high energy density rechargeable battery upon exposure to voltage in excess of the maximum safe voltage. The interrupt layer is sandwiched between the cathode energy layer and the cathode current collector. The interrupt layer, when unactivated, is laminated to the cathode current collector for conducting current there through. The interrupt layer, when activated, is delaminated from the cathode current collector for interrupting current there through. The interrupt layer includes a voltage sensitive decomposable component for decomposing upon exposure to voltage in excess of the maximum safe voltage. The voltage sensitive decomposable component evolves a gas upon decomposition. The evolved gas serves to delaminate the interrupt layer from the cathode current collector for interrupting current there through. The high energy density rechargeable metal-ion battery avoids thermal run-away in the overcharge by activation of the interrupt layer upon exposure to voltage in excess of the maximum safe voltage for interrupting current there though.

In some embodiments, the interrupt layer may be porous and have a composition that includes a ceramic powder defining an interstitial space, a binder for partially filling the interstitial space for binding the ceramic powder, and a conductive component dispersed within the binder for imparting conductivity to the interrupt layer. The interstitial space remains partially unfilled for imparting porosity and permeability to the interrupt layer. The interrupt layer may be compacted for reducing the unfilled interstitial space and increasing the binding of the ceramic powder by the binder. More particularly, the ceramic powder may have a weight percent of the interrupt layer greater than 30%; alternatively, the ceramic powder may have a weight percent of the interrupt layer greater than 50%; alternatively, the ceramic powder may have a weight percent of the interrupt layer greater than 70%; alternatively, the ceramic powder may have a weight percent of the interrupt layer greater than 75%; alternatively, the ceramic powder may have a weight percent of the interrupt layer greater than 80%. The interrupt layer may be permeable for transporting ionic charge carriers.

In some embodiments, the interrupt layer is non-porous and has a composition that includes a non-conductive filler, a binder for binding the non-conductive filler, and a conductive component dispersed within the binder for imparting conductivity to the interrupt layer.

In some embodiments, the interrupt layer is impermeable to transport of ionic charge carriers.

In some embodiments, the interrupt layer is sacrificial at voltages above the maximum safe voltage for recharging.

In some embodiments, the interrupt layer includes a ceramic powder that chemically decomposes above maximum safe voltage for evolving the gas. The gas may be a fire retardant.

In a related aspect, a method is provided for interrupting a recharging process for a high energy density rechargeable metal-ion battery upon exposure to voltage at or above a maximum safe voltage for avoiding overcharge. The high energy density rechargeable metal-ion battery is of a type that includes an anode energy layer, a cathode energy layer, a separator between the anode energy layer and the cathode energy layer, and an anode current collector for transferring electrons to and from the anode energy layer. In the first step of the method, the high energy density rechargeable metal-ion battery commences overcharging, thereby increasing the voltage above the maximum safe voltage for recharging. Then, in the second step of the method, the overcharging process of the first step is interrupted by evolving a gas by decomposition of a voltage sensitive decomposable component within an interrupt layer laminated to the cathode current collector. The evolved gas serves to delaminate the interrupt layer from the cathode current collector for interrupting the overcharging of the first step. The overcharging of the high energy density rechargeable metal-ion battery is interrupted by evolution of gas within the interrupt layer by delaminating the interrupt layer from the cathode current collector. It is disclosed herein that a high energy density rechargeable battery may usefully incorporate an internal non-sacrificial current limiter to protect the battery in the event of an internal short circuit. The current limiter is a resistive film of fixed resistance interposed between the separator and current collector. The fixed resistance of the resistive film remains stable when the battery is overheated.

It is disclosed herein that a high energy density rechargeable battery may usefully incorporate an internal sacrificial current interrupter to protect the battery in the event of battery overcharge. The current interrupter is a film containing a gas generating compound interposed between the separator and current collector. The gas generating compound is selected to have an electrolytic decomposition potential for decomposition and production of the gas at a voltage less than the overcharge voltage safe limit for the battery in which it is employed. The gas generated upon decomposition delaminates the current interrupter from the battery, thereby interrupting current flow.

It is disclosed herein that a high energy density rechargeable battery may usefully incorporate an internal sacrificial current interrupter to protect the battery from thermal runaway resulting from overheating. The current interrupter is a film containing a gas generating compound interposed between the negative and positive current collectors. The gas generating compound decomposes to produce the gas when the battery overheats. The temperature at which the gas generating compound decomposes is less than the temperature at which thermal runaway would result. The gas generated upon decomposition delaminates the current interrupter from the battery, thereby interrupting current flow.

It is disclosed herein that a high energy density rechargeable battery may usefully incorporate both an internal non-sacrificial current limiter and an internal sacrificial current interrupter to protect the battery in the event of an internal short circuit. The sacrificial current interrupter may be either voltage or temperature activated or both. The current limiter and the current interrupter may both be incorporated into the same layer, so that the layer is non-sacrificial below a critical temperature or voltage and sacrificial above the critical temperature or voltage.

BRIEF DESCRIPTION OF DRAWINGS

FIGS. 5A and 5B illustrate exemplified Cell compositions.

FIG. 6 illustrates the various positive electrode formulations use in chemical decomposition voltage measurements.

The cell voltage and temperature then dropped to a very low value due to the connection being lost when the cell caught fire. The overcharge current was 2 A until the cell caught fire and then dropped to about 0.2 A for one or two minutes and then back to 2 A because the cell was shorted. The cell burned.

FIG. 18 illustrates the cell voltage and temperature vs the overcharging time for the cell with Cell #3 ($CaCO_3$ layer). The cell voltage increased gradually up to 40 minutes and then rapidly increased to a maximum charge voltage of 12V at about 55 minutes. The cell temperature rapidly increased to above 80° C. starting at about 40 minutes and then decreased rapidly. The over charge current decreased significantly at 55° C. and kept to 0.2 A for the rest of the testing time. The cell swelled significantly after the test.

FIG. 19 illustrates the cell voltage and temperature vs the overcharging time for Cell #5 ($Na_2O_7Si_3+Al_2O_3$ layer). The cell voltage increased gradually up to 40 minutes and then rapidly increased to a maximum charge voltage 12V at about 75 minutes. The cell overcharge voltage profile is very different from $CaCO_3$ base resistive layer, which indicates the difference in the decomposition of $Na_2O_7Si_3$ compared with that of $CaCO_3$. The cell temperature increased significantly at about 40 minutes to above 75° C. and then decreased gradually. The over charge current decreased significantly at 75 minutes and kept to 1 A for the rest of the testing time. The cell swelled significantly after the test.

FIG. 20 summarizes the cell maximum temperature in the over charge test (2 A/12V) for Cell #1 (baseline), #3, #4, #5, and #6.

Figure 21:
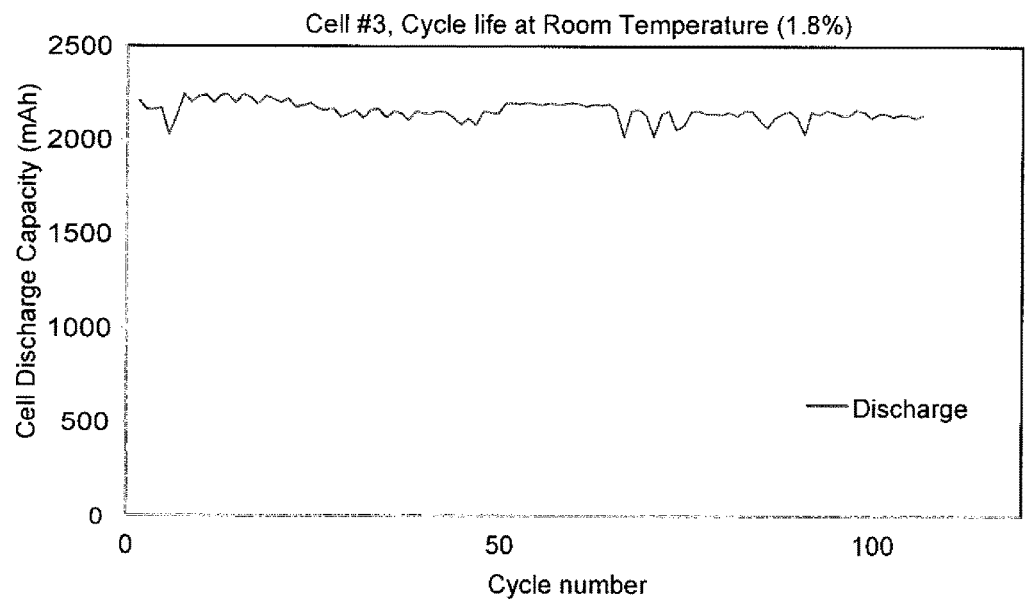

FIG. 21 illustrates the cycle life of Cell #3 ($CaCO_3$ resistive layer). The cell lost about 1.8% after 100 cycles which is lower than that of the cells without any resistive layer (~2.5% by average, not shown).

Figure 22:
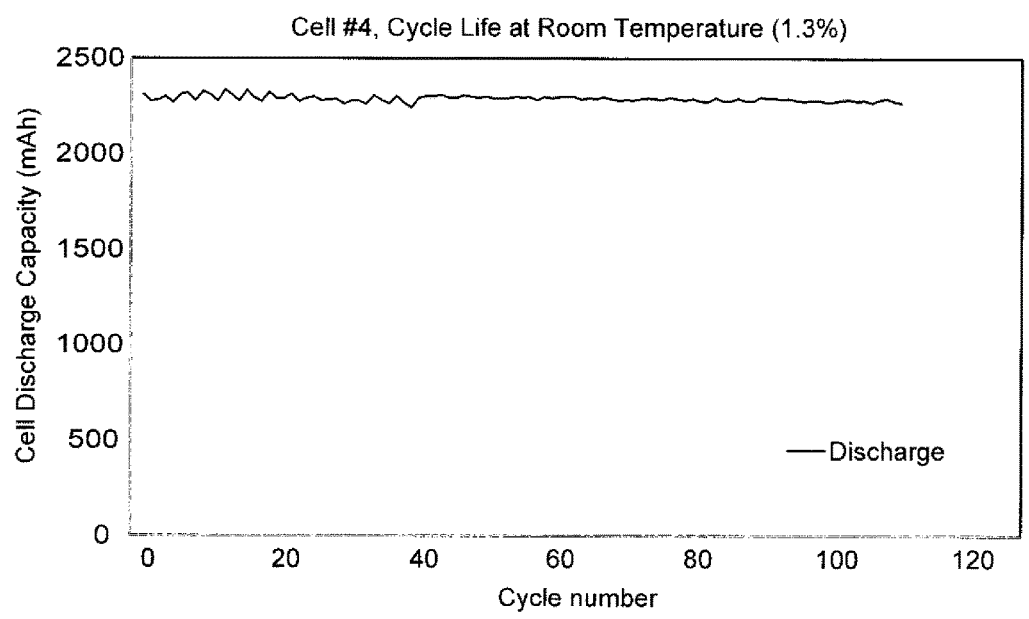

FIG. 22 illustrates the cycle life of Cell #4 ($CaCO_3$ and $Al_2O_3$ resistive layer). The cell lost about 1.3% after 100 cycles which is lower than that of the cells without any resistive layer (~2.5% by average, not shown).

Figures 23, 24:
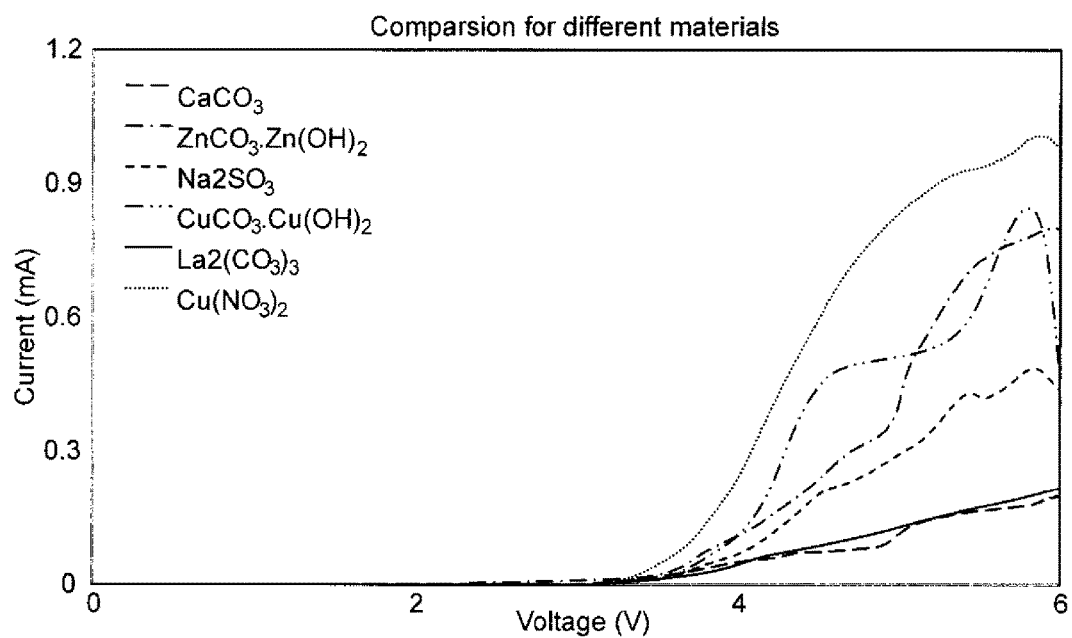

FIG. 23 illustrates the current profiles vs the voltage at room temperature for compounds (gas generators) containing different anions for potential use in rechargeable batteries with different operation voltage. The peak current and voltages are listed in FIG. 24. The peak current for $Cu(NO_3)_2$ was the highest while the peak current for $CaCO_3$ was the lowest. The peak voltage for $Cu(NO_3)_2$ was the lowest while the peak voltage of $CaCO_3$ was the highest. Therefore, $Cu(NO_3)_2$ may be useful in lithium ion batteries with a relatively low operation voltage such as lithium ion cell using lithium iron phosphate positive electrode (3.7 V as the typical maximum charging voltage). $CaCO_3$ may be useful in lithium ion batteries with a high operation voltage like lithium ion cell using the high voltage positive such as lithium cobalt oxide (4.2V as the typical maximum charging voltage) or lithium nickel cobalt manganese oxides (4.3 or 4.4V as the typical high charging voltage).

FIG. 24 summarizes the peak current and voltage for compounds containing different anions.

Figures 25, 26:
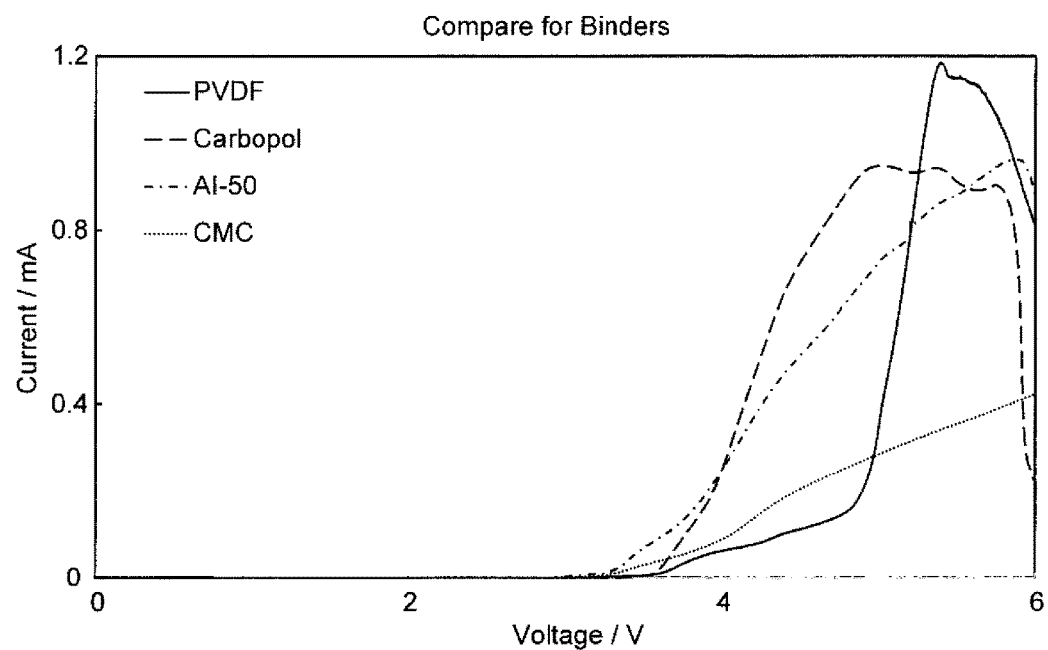

FIG. 25 illustrates the current profiles vs the voltage at room temperature for the polymers (organic gas generators) with or without different anions for potential use in rechargeable batteries with different operation voltage. PVDF is included as the reference. The peak current and voltages are listed in FIG. 26. The peak current for Carbopol, AI-50 and PVDF were very similar while CMC was the lowest. The peak voltage of Carbopol was the lowest while the CMC peak voltage was the highest. Therefore, Carbopol containing $CO_3^{-2}$ anion maybe useful in lithium ion batteries with a relatively low operation voltage such as lithium ion cell using lithium iron phosphate positive electrode (3.7 V as the typical maximum charging voltage). CMC maybe useful in lithium ion batteries with a high operation voltage like lithium ion cell using the high voltage positive such as lithium cobalt oxide (4.2V as the typical maximum charging voltage) or lithium nickel cobalt manganese oxides (4.3 or 4.4V as the typical high charging voltage). Water is one of CMC decomposition compound and will become vapor or gas above 100° C.

FIG. 26 summarizes the peak current and voltage for polymers with or without different anions.

Figure 27:
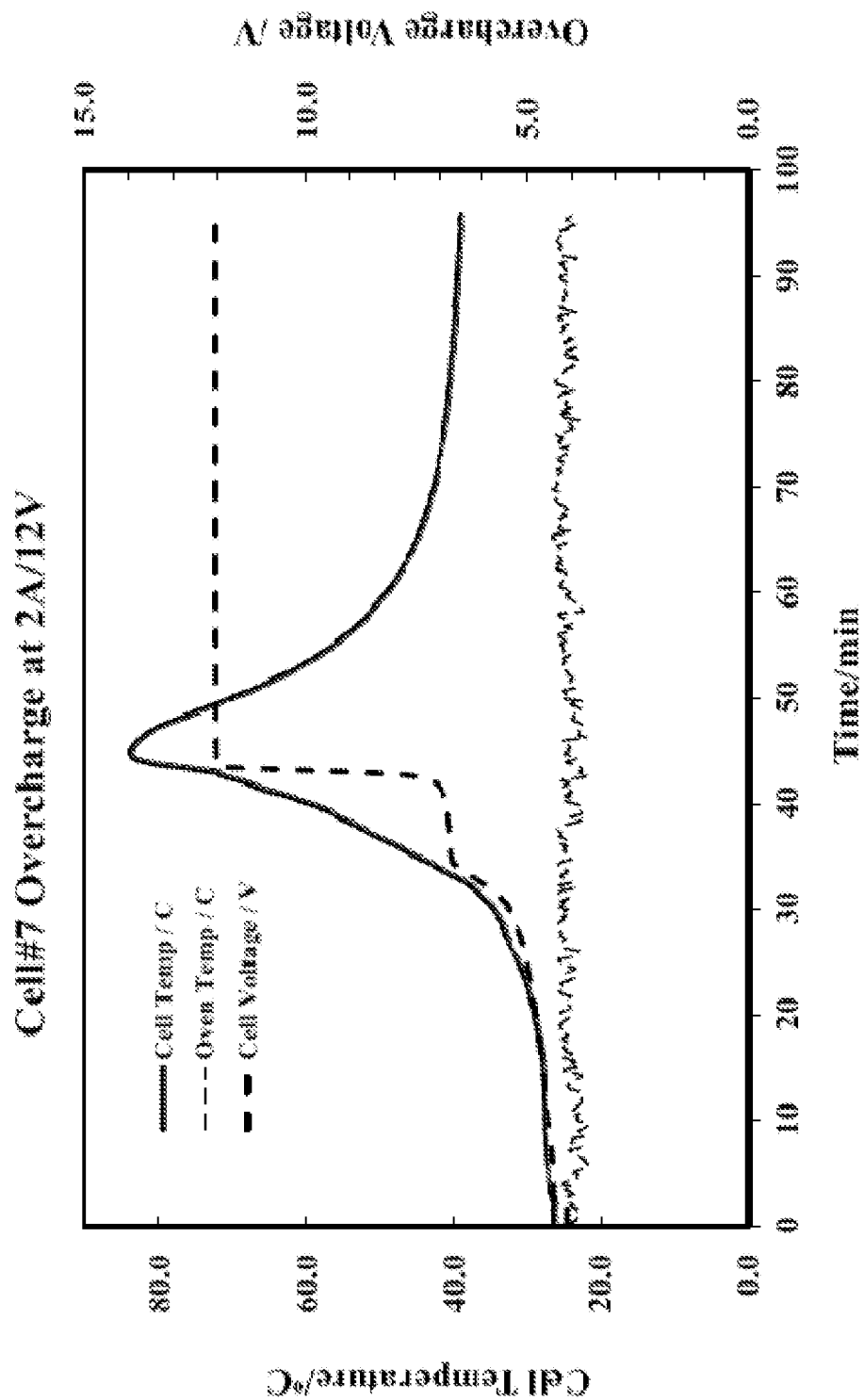

FIG. 27 shows cell temperature and overcharge voltage profiles during 2 A/12V overcharge test at room temperature.

DETAILED DESCRIPTION

Safe, long-term operation of high energy density rechargeable batteries, including lithium ion batteries, is a goal of battery manufacturers. One aspect of safe battery operation is controlling the reactions at the electrodes of these rechargeable batteries during both battery charging and discharge. As described above, electrical current flows outside the battery, through an external circuit during use, while ions move from one electrode to another within the battery. In some cases, overcharge occurs and can lead to thermal runaway within the battery. Described below are apparatus and methods associated with an internal current limiter that limits the rate of internal discharge in a rechargeable battery when there is an internal short circuit.

A high energy density rechargeable (HEDR) metal-ion battery that includes an anode energy layer, a cathode energy layer, a separator for separating the anode energy layer from the cathode energy layer, and an anode current collector for transferring electrons to and from the anode energy layer is described herein. The high energy density rechargeable metal-ion battery is rechargeable and characterized by a maximum safe voltage for avoiding overcharge. The improvement comprises an interrupt layer activatable for interrupting current within the high energy density rechargeable battery upon exposure to voltage in excess of the maximum safe voltage. The interrupt layer is sandwiched between the cathode energy layer and the cathode current collector. The interrupt layer, when unactivated, is laminated to the cathode current collector for conducting current therethrough. The interrupt layer, when activated, is delaminated from the cathode current collector for interrupting current therethrough. The interrupt layer includes a voltage sensitive decomposable component for decomposing upon exposure to voltage in excess of the maximum safe voltage. The voltage sensitive decomposable component evolves a gas upon decomposition. The evolved gas serves to delaminate the interrupt layer from the anode current collector for interrupting current therethrough. The high energy density rechargeable metal-ion battery avoids thermal run away in the overcharge by activation of the interrupt layer upon exposure to voltage in excess of the maximum safe voltage for interrupting current therethough. Methods for using and making the high energy density rechargeable (HEDR) metal-ion battery are also described herein.

In some embodiments, the interrupt layer can include a voltage sensitive decomposable component that evolves gas in an amount ranging from about 1% by weight (e.g. 1 wt %) to about 99% by weight (e.g. 99 wt %). Further, the interrupt layer can include a voltage sensitive decomposable component that evolves gas in an amount ranging from about 30% by weight to about 90% by weight, including an amount ranging from about 60% by weight to about 80% by weight.

Figure 1A:
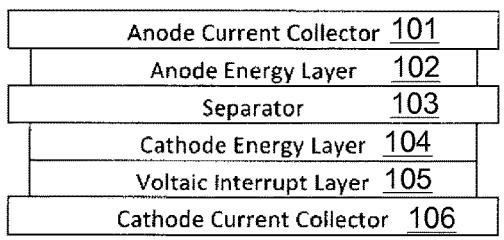
FIGS. 1A and 1B illustrate schematic representations of exemplary configurations of film-type lithium ion batteries having one or more gas generating layers serving a current interrupters for protecting the battery against overcharging and overheating in the event of an internal short circuit.
Figure 1B:
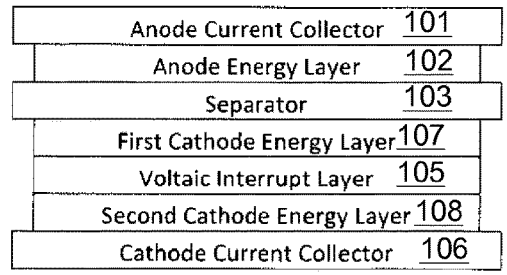

FIGS. 1A and 1B illustrate schematic representations of exemplary configurations of film-type lithium ion batteries having one or more gas generating layers serving current interrupters for protecting the battery against overcharging and overheating in the event of an internal short circuit. Gas generation is triggered by an elevation in voltage caused by overcharging. FIG. 1A shows a configuration for a battery with an anode current collector 101, an anode energy layer 102, a separator 103, a cathode energy layer 104, a voltaic interrupt layer 105, and a cathode current collector 106. The configuration shown in FIG. 1B has an anode current collector 101, an anode energy layer 102, a separator 103, a first cathode energy layer 107, a voltaic interrupt layer 105, a second cathode energy layer 108, and a cathode current collector 106.

Figure 2A:
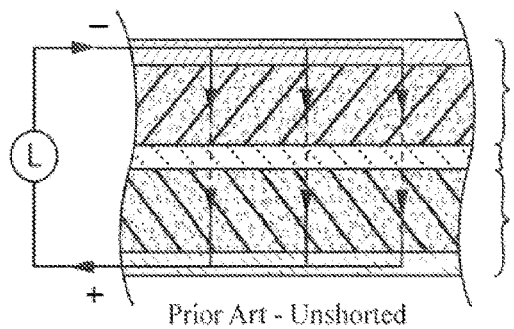
FIGS. 2A-2E illustrate cross sectional views of prior art film-type lithium ion batteries (FIGS. 2A and B) and of film-type lithium ion batteries as described herein (FIGS. 2C and D).
Figure 2B:
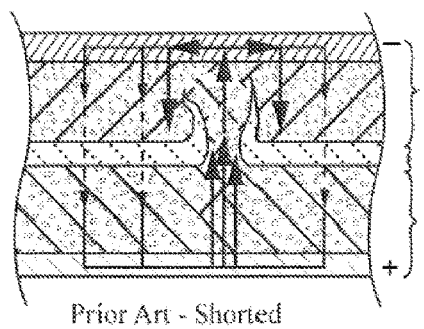
Figure 2C:
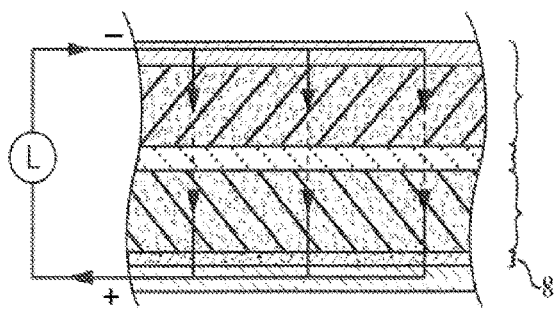
Figure 2D:
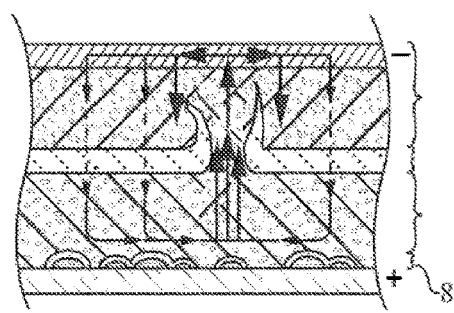
Figure 2E:
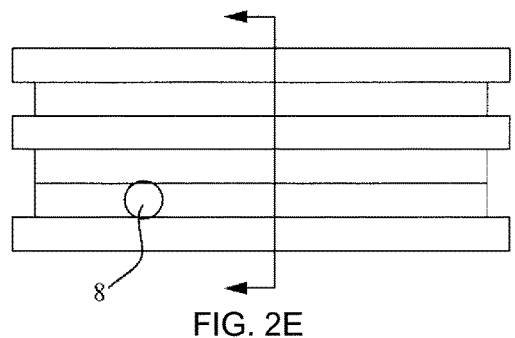

FIGS. 2A-2E illustrate cross sectional views of prior art film-type lithium ion batteries (FIGS. 2A and B) and of film-type lithium ion batteries with an interrupt layer (FIGS. 2C and D). More particularly, FIGS. 2A-2E illustrate the current flow through film-type lithium ion batteries undergoing discharge for powering a load (L). FIGS. 2A and C illustrate the current flow of film-type lithium ion batteries having an intact fully operational separator (unshorted). FIGS. 2B and D illustrate the current flow of film-type lithium ion batteries having gas generating layers serving as current interrupters, wherein the separator has been short circuited by a conductive dendrite penetrating therethrough. In FIGS. 2B and D, the cells are undergoing internal discharge. Note that devices with unshorted separators (FIGS. 2A and C) and the prior art device with the shorted separator (FIG. 2B), current flows from one current collector to the other. However, in the exemplary device with an interrupt layer, shown in FIG. 2E, having a shorted separator, the activated gas generating layer 8 (FIG. 2D) has delaminated from the current collector and the current flow is diverted from the current collector and is much reduced.

Figure 3A:
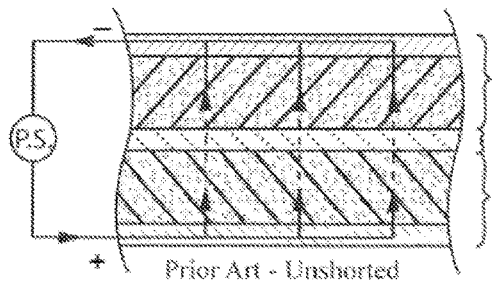
FIGS. 3A-3E illustrate cross sectional views of prior art film-type lithium ion batteries (FIGS. 3A and B) and of film-type lithium ion batteries as described herein (FIGS. 3C and D).
Figure 3B:
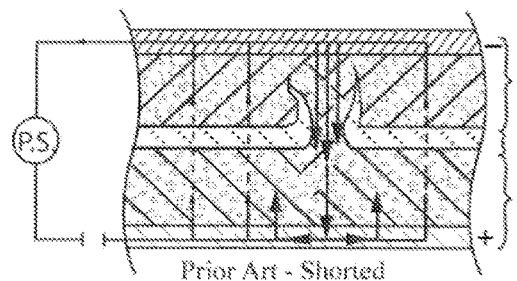
Figure 3C:
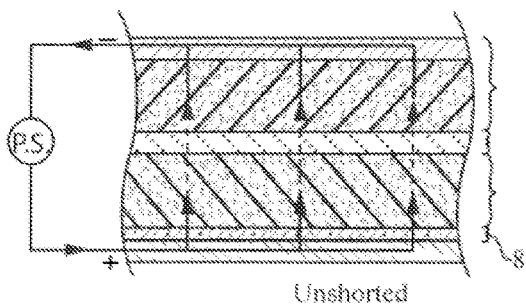
Figure 3D:
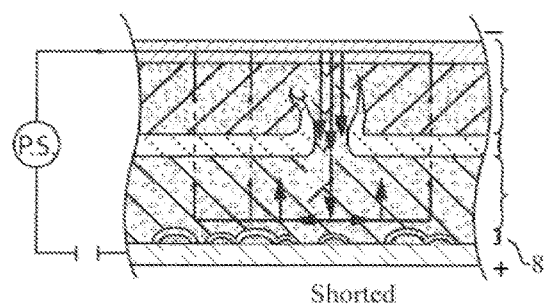
Figure 3E:
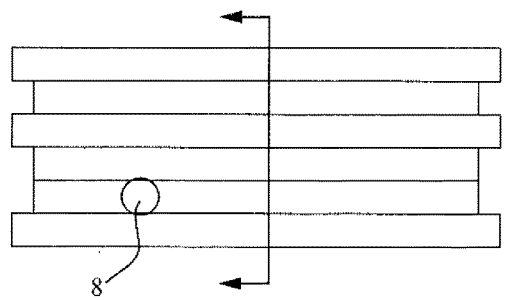

FIGS. 3A-3E illustrate cross sectional views of prior art film-type lithium ion batteries (FIGS. 3A and B) and of film-type lithium ion batteries with an interrupt layer (FIGS. 3C and D). More particularly, FIGS. 3A-3E illustrate the current flow through film-type lithium ion batteries while its being charged by a smart power supply (PS) which will stop the charging process when it detects any abnormal charging voltage. FIGS. 3A and C illustrate the current flow of film-type lithium ion batteries having an intact fully operational separator (unshorted). FIGS. 3B and D illustrate the current flow of film-type lithium ion batteries having gas generating layers serving as current interrupters, wherein the separator has been short circuited by a conductive dendrite penetrating therethrough. In FIGS. 3B and D, the cells are undergoing internal discharge. Note that devices with unshorted separators (FIGS. 3A and C) and the prior art device with the shorted separator (FIG. 3B), current flows from one current collector to the other. However, in the exemplary device with an interrupt layer, as shown in FIG. 3E, having a shorted separator, the activated gas generating layer 8 (FIG. 3D) has delaminated from the current collector and the current flow is diverted from the current collector and is much reduced.

Figure 4A:
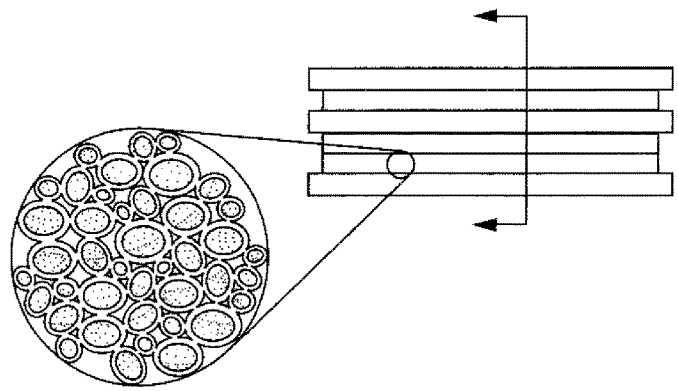
FIGS. 4A-4C illustrate exemplary structures for the gas generating layer (8).
Figure 4B:
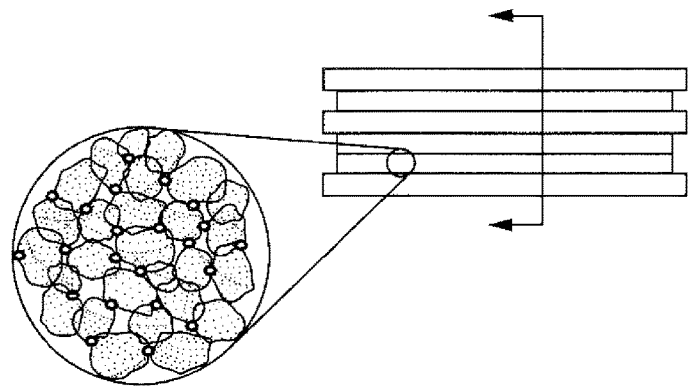
Figure 4C:
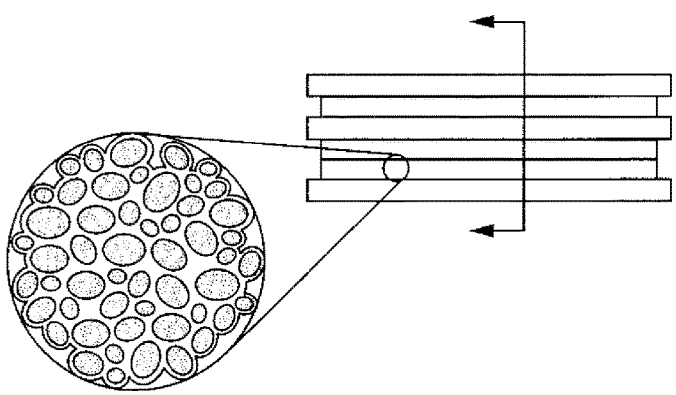

FIGS. 4A-4C illustrate exemplary structures for the gas generating layer (8). FIG. 4A illustrates resistive layer having a high proportion of ceramic particles coated with binder. Interstitial voids between the coated ceramic particles render the resistive layer porous. FIG. 4B illustrates resistive layer having a high proportion of ceramic particles (80% or more) bound together by particles of binder. Interstitial voids between the coated ceramic particles render the resistive layer porous. FIG. 4C illustrates resistive layer having an intermediate proportion of ceramic particles held together with binder. The resistive layer lacks interstitial voids between the coated ceramic particles and is nonporous.

The following abbreviations have the indicated meanings:
Carbopol®-934=cross-linked polyacrylate polymer supplied by Lubrizol Advanced Materials, Inc.
CMC=carboxymethyl cellulose
CMC-DN-800H=CMC whose sodium salt of the carboxymethyl group had been replaced by ammonium (supplied by Daicel FineChem Ltd).
DEC=diethyl carbonate
EC=ethylene carbonate
EMC=ethyl-methyl carbonates
MCMB=mesocarbon microbeads
NMC=Nickel, Manganese and Cobalt
NMP=N-methylpyrrolidone
PTC=positive temperature coefficient
PVDF=polyvinylidene fluoride
SBR=styrene butadiene rubber
Super P®=conductive carbon blacks supplied by Timcal
Torlon® AI-50=water soluble analog of Torlon® 4000TF
Torlon® 4000TF=neat resin polyamide-imide (PAI) fine powder Resistance layer and electrode active layer preparation and cell assembly are described below.

In general, resistance layer preparation includes the following steps (first layer):
 i. Dissolve the binder into an appropriate solvent.
 ii. Add the conductive additive and ceramic powder into the binder solution to form a slurry.
 iii. Coat the slurry made in Step ii. onto the surface of a metal foil, and then dry it to form a resistance layer on the surface of the foil.

Electrode preparation (on the top of the first layer) generally includes the following:
 i. Dissolve the binder into an appropriate solvent.
 ii. Add the conductive additive into the binder solution to form a slurry.
 iii. Put the cathode or anode material into the slurry made in the Step v. and mix it to form the slurry for the electrode coating.
 iv. Coat the electrode slurry made in the Step vi. onto the surface of the layer from Step iii.
 v. Compress the electrode into the design thickness.

Cell assembly includes the following:
 i. Dry the positive electrode at 125° C. for 10 hours and negative electrode at 140° C. for 10 hours.
 ii. Punch the electrodes into the pieces with the electrode tab.
 iii. Laminate the positive and negative electrodes with the separator as the middle layer.
 iv. Put the flat jelly-roll made in the Step xi. into the aluminum composite bag.

Impact testing of the cell battery includes the following (See FIG. 13):
 i. Charge the cell at 2 A and 4.2V for 3 hours.
 ii. Put the cell onto a hard flat surface such as concrete.
 iii. Attach a thermal couple to the surface of the cell with high temperature tape and connect the positive and negative tabs to the voltage meter.
 iv. Place a steel rod (15.8 mm+0.1 mm in diameter×about 70 mm long) on its side across the center of the cell.

v. Suspend a 9.1+0.46 Kg steel block (75 mm in diameter×290 mm high) at a height of 610+25 mm above the cell.
vi. Using a containment tube (8 cm inside diameter) to guide the steel block, release the steel block through the tube and allow it to free fall onto the steel bar laying on the surface of the cell causing the separator to breach while recording the temperature.
vii. Leave the steel rod and steel block on the surface of the cell until the cell temperature stabilizes near room temperature.
viii. End test.

The overcharge test generally follows the protocol below.
i. Charge the cell at 2 A and 4.2V for 3 hours.
ii. Put the charged cell into a room temperature oven.
iii. Connect the cell to a power supply (manufactured by Hewlett-Packard).
iv. Set the voltage and current on the power supply to 12V and 2 A.
v. Turn on the power supply to start the overcharge test while recording the temperature and voltage.
vi. Test ends when the cell temperature decreases and stabilizes near room temperature.

Resistance Measurement Test protocol is as follows.
i. Place one squared copper foil (4.2×2.8 cm) with the tab on to a metal plate (~12x~8 cm). Then cut a piece of thermal tape and carefully cover the squared copper foil.
ii. Cut a piece of the electrode that is slightly larger than the copper paper. Place the electrode on to the copper foil.
iii. Place another copper foil (4.2×2.8 cm) with tab on the electrode surface, repeat steps i-ii with it.
iv. At this point, carefully put them together and cover them using high temperature tape and get rid of any air bubble
v. Cut a "V" shaped piece of metal off both tabs.
vi. Attach the completed strip to the metal clamp and tighten the screws. Make sure the screws are really tight.
vii. Attach the tabs to the connectors of Battery HiTester (produced by Hioki USA Corp.) to measure the resistance to make sure that a good sample has been made for the measurement.
viii. Put the metal clamp inside the oven, connect the "V" shaped tabs to the connectors and then tightened the screw. Tape the thermal couple onto the metal clamp.
ix. Attach the Battery HiTester to the wires from oven. Do not mix up the positive and the negative wires.
x. Close the oven and set the temperature to 200° C. at 4° C. per minute, and start the test. Record data every 15 seconds.
xi. Stop recording the data when the metal clamp and oven reach just a little over 200° C.
xii. Turn off the oven and the Battery HiTester.
xiii. End Test.

The Cycle Life procedure includes the following.
i. Rest for 5 minutes.
ii. Discharge to 2.8V.
iii. Rest for 20 minutes.
iv. Charge to 4.2V at 0.7 A for 270 minutes.
v. Rest for 10 minutes.
vi. Discharge to 2.8V at 0.7 A.
vii. Rest for 10 minutes.
viii. Repeat Steps iii to vii 100 times.
ix. End test.

The discharge test at 1 A, 3 A, 6 A, 10 A includes the following protocol. The cell is usually tested in a chamber with a controlled temperature, for example 50° C.
i. Rest for 5 minutes.
ii. Discharge to 2.8V.
iii. Rest for 20 minutes.
iv. Charge to 4.2V at 0.7 A for 270 minutes.
v. Rest for 10 minutes.
vi. Discharge to 2.8V at 1 A.
vii. Rest for 10 minutes.
viii. Charge to 4.2V at 0.7 A for 270 minutes.
ix. Rest for 10 minutes.
x. Discharge to 2.8V at 3 A.
xi. Charge to 4.2V at 0.7 A for 270 minutes.
xii. Rest for 10 minutes.
xiii. Discharge to 2.8V at 6 A.
xiv. Charge to 4.2V at 0.7 A for 270 minutes.
xv. Rest for 10 minutes.
xvi. Discharge to 2.8V at 10 A.
xvii. Rest for 10 minutes.
xviii. End Test.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

As used herein, "high energy density rechargeable (HEDR) battery" means a battery capable of storing relatively large amounts of electrical energy per unit weight on the order of about 50 W-hr/kg or greater and is designed for reuse, and is capable of being recharged after repeated uses. Non-limiting examples of HEDR batteries include metal-ion batteries and metallic batteries.

As used herein, "metal-ion batteries" means any rechargeable battery types in which metal ions move from the negative electrode to the positive electrode during discharge and back when charging. Non-limiting examples of metal-ion batteries include lithium-ion, aluminum-ion, potassium-ion, sodium-ion, magnesium-ion, and others.

As used herein, "metallic batteries" means any rechargeable battery types in which the anode is a metal or metal alloy. The anode can be solid or liquid. Metal ions move from the negative electrode to the positive electrode during discharge and back when charging. Non-limiting examples of metallic batteries include M-S, $M-NiCl_2$, $M-V_2O_5$, $M-Ag_2VP_2O_8$, $M-TiS_2$, $M-TiO_2$, $M-MnO_2$, $M-Mo_3S_4$, $M-MoS_6Se_2$, $M-MoS_2$, $M-MgCoSiO_4$, $M-Mg_{1.03}Mn_{0.97}SiO_4$, and others, where M=Li, Na, K, Mg, Al, or Zn.

As used herein, "lithium-ion battery" means any rechargeable battery types in which lithium ions move from the negative electrode to the positive electrode during discharge and back when charging. Non-limiting examples of lithium-ion batteries include lithium cobalt oxide ($LiCoO_2$), lithium iron phosphate ($LiFePO_4$), lithium manganese oxide ($LiMn_2O_4$), lithium nickel oxide ($LiNiO_2$), lithium nickel manganese cobalt oxide ($LiNiMnCoO_2$), lithium nickel cobalt aluminum oxide ($LiNiCoAlO_2$), lithium titanate ($Li_4Ti_5O_{12}$), lithium titanium dioxide, lithiumlgraphene, lithium/graphene oxide coated sulfur, lithium-sulfur, lithium-purpurin, and others. Lithium-ion batteries can also come with a variety of anodes including silicon-carbon nanocomposite anodes and others. Lithium-ion batteries can be in various shapes including small cylindrical (solid body without terminals), large cylindrical (solid body with large threaded terminals), prismatic (semi-hard plastic case with large threaded terminals), and pouch (soft, flat body). Lithium polymer batteries can be in a soft package or pouch. The electrolytes in these batteries can be a liquid electrolyte (such as carbonate based or ionic), a solid electrolyte, a polymer based electrolyte or a mixture of these electrolytes.

As used herein, "aluminum-ion battery" means any rechargeable battery types in which aluminum ions move from the negative electrode to the positive electrode during discharge and back when charging. Non-limiting examples of aluminum-ion batteries include $Al_nM_2(XO_4)_3$, wherein X=Si, P, S, Mo, As, and others; and M=Fe, Ca, Mg, V, Cr and others; aluminum transition-metal oxides ($Al_xMO_2$ wherein M=Fe, Mn, Ni, Mo, Co, Cr, Ti, V and others) such as $Al_x(V_4O_8)$, $Al_xNiS_2$, $Al_xFeS_2$, $Al_xVS_2$ and $Al_xWS_2$ and others.

As used herein, "potassium-ion battery" means any rechargeable battery types in which potassium ions move from the negative electrode to the positive electrode during discharge and back when charging. Non-limiting examples of potassium-ion batteries include $K_nM2(XO_4)_3$, wherein X=Si, P, S, Mo, As, and others; and M=Fe, Ca, Mg, V, Cr and others; potassium transition-metal oxides ($KMO_2$ wherein M=Fe, Mn, Ni, Mo, Co, Cr, Ti, V and others), and others.

As used herein, "sodium-ion battery" means any rechargeable battery types in which sodium ions move from the negative electrode to the positive electrode during discharge and back when charging. Non-limiting examples of sodium-ion batteries include $Na_nM_2(XO_4)_3$, wherein X=Si, P, S, Mo, As, and others; and M=Fe, Ca, Mg, V, Cr and others; $NaV_{1-x}$, $Cr_x(PO_4F$, $NaVPO_4F$, $Na_4Fe_3(PO_4)_2(P_2O_7)$, $Na_2FePO_4F$, $Na_2FeP_2O_7$, $Na_{2/3}[Fe_{1/2}Mn_{1/2}]O_2$, $Na(Ni_{1/3}Fe_{1/3}Mn_{1/3})O_2$, $NaTiS_2$, $NaFeF_3$; Sodium Transition-Metal Oxides ($NaMO_2$ wherein M=Fe, Mn, Ni, Mo, Co, Cr, Ti, V and others) such as $Na_{2/3}[Fe_{1/2}Mn_{1/2}]O_2$, $Na(Ni_{1/3}Fe_{1/3}Mn_{1/3})O_2$, $Na_xMo_2O_4$, $NaFeO_2$, $Na_{0.7}CoO_2$, $NaCrO_2$, $NaMnO_2$, $Na_{0.44}MnO_2$, $Na_{0.7}MnO_2$, $Na_{0.7}MnO_{2.25}$, $Na_{2/3}Mn_{2/3}Ni_{1/3}O_2$, $Na_{0.61}Ti_{0.47}Mn_{0.52}O_2$; Vanadium Oxides such as $Na_{1+x}V_3O_8$, $Na_xV_2O_5$, and $Na_xVO_2$ (x 0.7, 1); and others.

As used herein, "magnesium-ion battery" means any rechargeable battery types in which magnesium ions move from the negative electrode to the positive electrode during discharge and back when charging. Non-limiting examples of magnesium-ion batteries include $Mg_nM_2(XO_4)_3$, wherein X=Si, P, S, Mo, As, and others; and M=Fe, Ca, Mg, V, Cr and others; magnesium Transition-Metal Oxides ($MgMO_2$ wherein M=Fe, Mn, Ni, Mo, Co, Cr, Ti, V and others), and others.

As used herein, "silicon-ion battery" means any rechargeable battery types in which silicon ions move from the negative electrode to the positive electrode during discharge and back when charging. Non-limiting examples of silicon-ion batteries include $Si_nM_2(XO_4)_3$, wherein X=Si, P, S, Mo, As, and others; and M=Fe, Ca, Mg, V, Cr and others; Silicon Transition-Metal Oxides ($SiMO_2$ wherein M=Fe, Mn, Ni, Mo, Co, Cr, Ti, V and others), and others.

As used herein, "binder" means any material that provides mechanical adhesion and ductility with inexhaustible tolerance of large volume change. Non-limiting examples of binders include styrene butadiene rubber (SBR)-based binders, polyvinylidene fluoride (PVDF)-based binders, carboxymethyl cellulose (CMC)-based binders, poly(acrylic acid) (PAA)-based binders, polyvinyl acids (PVA)-based binders, poly(vinylpyrrolidone) (PVP)-based binders, and others.

As used herein, "conductive additive" means any substance that increases the conductivity of the material. Non-limiting examples of conductive additives include carbon black additives, graphite nonaqueous ultrafine carbon (UFC) suspensions, carbon nanotube composite (CNT) additives (single and multi-wall), carbon nano-onion (CNO) additives, graphene-based additives, reduced graphene oxide (rGO), conductive acetylene black (AB), conductive poly (3-methylthiophene) (PMT), filamentary nickel powder additives, aluminum powder, electrochemical active oxides such as lithium nickel manganese cobalt oxides and others.

As used herein, "metal foil" means any metal foil that under high voltage is stable. Non-limiting examples of metal foils include aluminum foil, copper foil, titanium foil, steel foil, nano-carbon paper, graphene paper, carbon fiber sheet, and others.

As used herein, "ceramic powder" means any electrical insulator or electrical conductor that hasn't been fired. Non-limiting examples of ceramic powder materials include barium titanate ($BaTiO_3$), zirconium barium titanate, strontium titanate ($SrTiO_3$), calcium titanate ($CaTiO_3$), magnesium titanate ($MgTiO_3$), calcium magnesium titanate, zinc titanate ($ZnTiO_3$), lanthanum titanate ($LaTiO_3$), and neodymium titanate ($Nd_2Ti_2O_7$), barium zirconate ($BaZrO_3$), calcium zirconate ($CaZrO_3$), lead magnesium niobate, lead zinc niobate, lithium niobate ($LiNbO_3$), barium stannate ($BaSnO_3$), calcium stannate ($CaSnO_3$), magnesium aluminum silicate, sodium silicate ($NaSiO_3$), magnesium silicate ($MgSiO_3$), barium tantalate ($BaTa2O_6$), niobium oxide, zirconium tin titanate, and others.

As used herein, "gas generator material" means any material which will thermally decompose to produce a fire retardant gas. Non-limiting examples of gas generater materials include inorganic carbonates such as $M_n(CO_3)_m$, $M_n(SO_3)_m$, $M_n(NO_3)_m$, $^1M_n{}^2M_n(CO_3)_x$ and others and organic carbonates such as polymethacrylic [—$CH_2$—C($CH_3$)(COOM)-]$_p$ and polyacrylate salts [—$CH_2$—CH(COOM)-]$_p$, and others wherein M, $^1$M, $^2$M are independently selected from the group consisting of Ba, Ca, Cd, Co, Cu, Fe, K, Li, Mg, Mn, Na, Ni, Pb, Sr, and Zn; n is 1-3 and m is 1-4. In some embodiments, M is independently selected from the group consisting of an ammonium ion, pyridinium ion and a quaternary ammonium ion.

Layers were coated onto metal foils by an automatic coating machine (compact coater, model number 3R250W-2D) produced by Thank-Metal Co., Ltd. Layers are then compressed to the desired thickness using a calender machine (model number X15-300-1-DZ) produced by Beijing Sevenstar Huachuang Electronics Co., Ltd.

EXAMPLES

Example 1

Preparation of baseline electrodes, positive and negative electrodes, and the completed Cell #1 for the evaluation in the resistance measurement, discharge capability tests at 50° C., impact test, and cycle life test are described below.

A) Preparation of POS1A as an Example of the Positive Electrode Preparation.

i) PVDF (21.6 g) was dissolved into NMP (250 g); ii) Carbon black (18 g) was added and mixed for 15 minutes at 6500 rpm; ii) $LiNi_{0.5}Mn_{0.3}Co_{0.2}O_2$ (NMC) (560.4 g) was added to the slurry from Step ii and mixed for 30 minutes at 6500 rpm to form a flowable slurry; iv) Some NMP was added for the viscosity adjustment; v) This slurry was coated onto 15 μm aluminum foil using an automatic coating machine with the first heat zone set to about 80° C. and the second heat zone to about 130° C. to evaporate off the NMP. The final dried solid loading was about 15.55 mg/cm². The positive layer was then compressed to a thickness of about 117 μm. The electrode made here was designated as zero voltage against a standard graphite electrode and was used for the impedance measurement at 0 V in relation to the temperature, and the dry for the cell assembly.

B) Preparation of NEG2A as an Example of the Negative Electrode Preparation i) CMC (5.2 g) was dissolved into deionized water (~300 g); ii) Carbon black (8.4 g) was added and mixed for 15 minutes at 6500 rpm; iii) Negative active graphite (JFE Chemical Corporation; Graphitized Mesophase Carbon Micro Bead (MCMB) and Synthetic Graphite (TIMCAL) (378.4 g in total) were added to the slurry from Step ii and mixed for 30 minutes at 6500 rpm to form a flowable slurry; iv) SBR (solid content 50% suspended in water) (16.8 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 70° C. and the second heat zone to about 100° C. to evaporate off the water. The final dried solid loading was about 9.14 mg/cm². The negative electrode layer was then compressed to a thickness of about 117 μtm. The negative made was used for the dry for the cell assembly.

C) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat in an aluminum composite bag; v) The bag from Step iv was dried in a 70° C. vacuum oven; vi) The bag from Step v was filled with the LiPF$_6$ containing organic carbonate based electrolyte; vii) The bag from Step vi was sealed; viii) Rest for 16 hours; ix) The cell was charged to 4.2V at C/20 rate for 5 hours and then to 4.2V at 0.5C rate for 2 hours, then rest for 20 minutes, then discharged to 2.8V at 0.5C rate; x) Under vacuum, the cell was punctured to release any gases and then resealed. The cell made here was used for grading and other tests such as discharging capability test at 50° C., impact test, cycle life test and so on.

Figure 7:
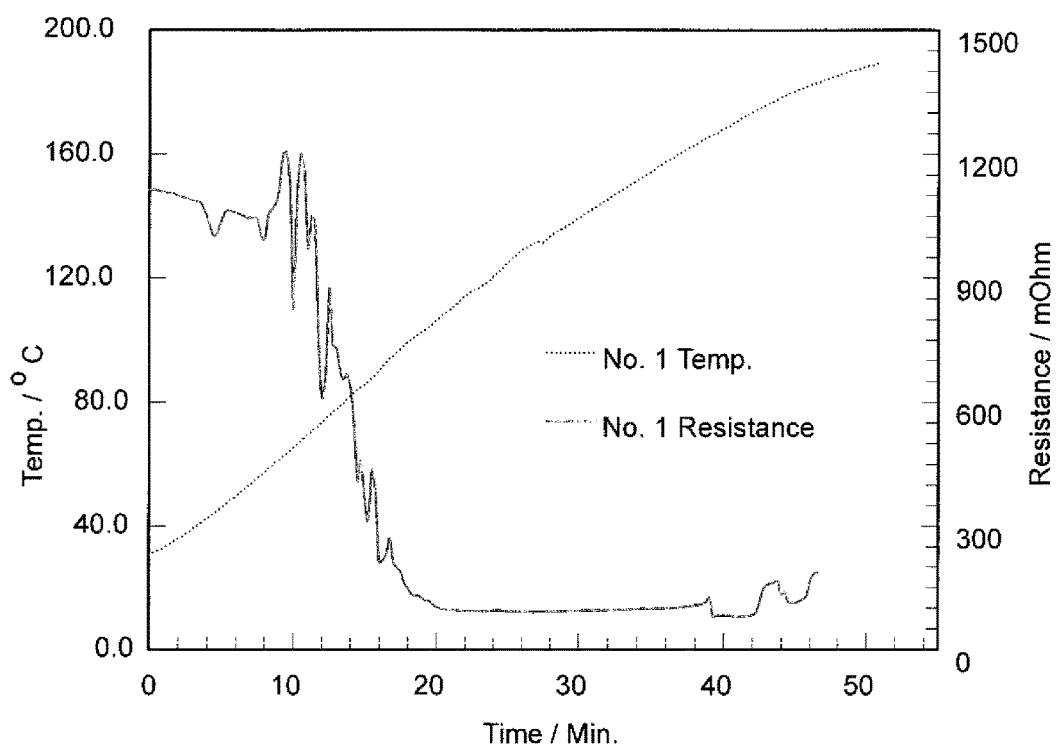
FIG. 7 illustrates the resistance of Cell #2 at 3.6V vs graphite in relation to the temperature increase. The resistance decrease about 10 times with the increase in the temperature.
Figure 10:
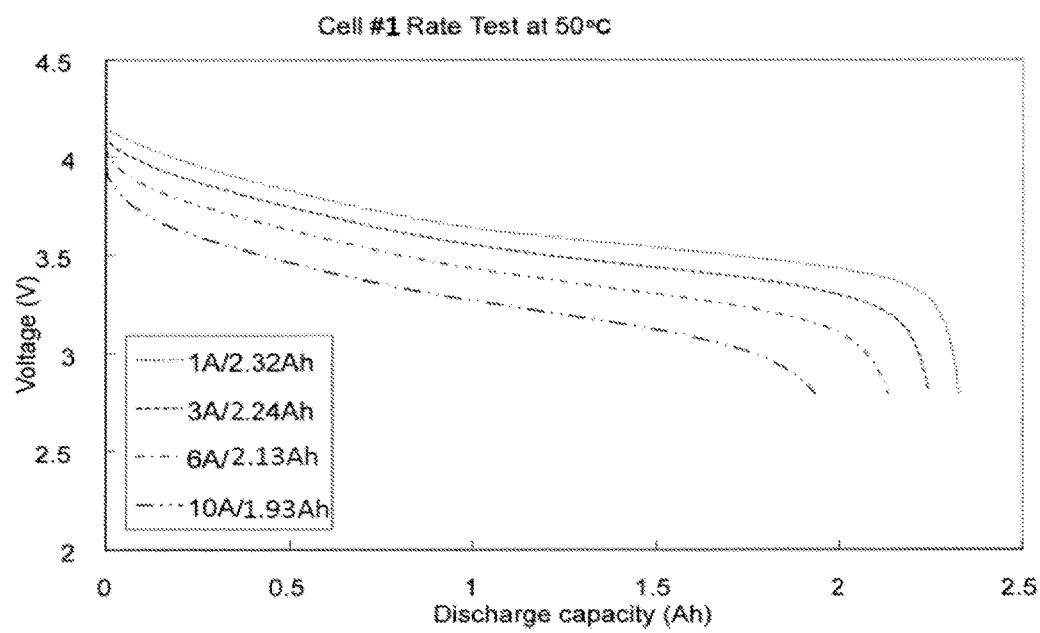
FIG. 10 illustrates the discharge capacity of Cell #1 (no any resistive layer) vs the cell voltage at 1 A, 3 A, 6 A and 10 A.
Figures 12, 13:
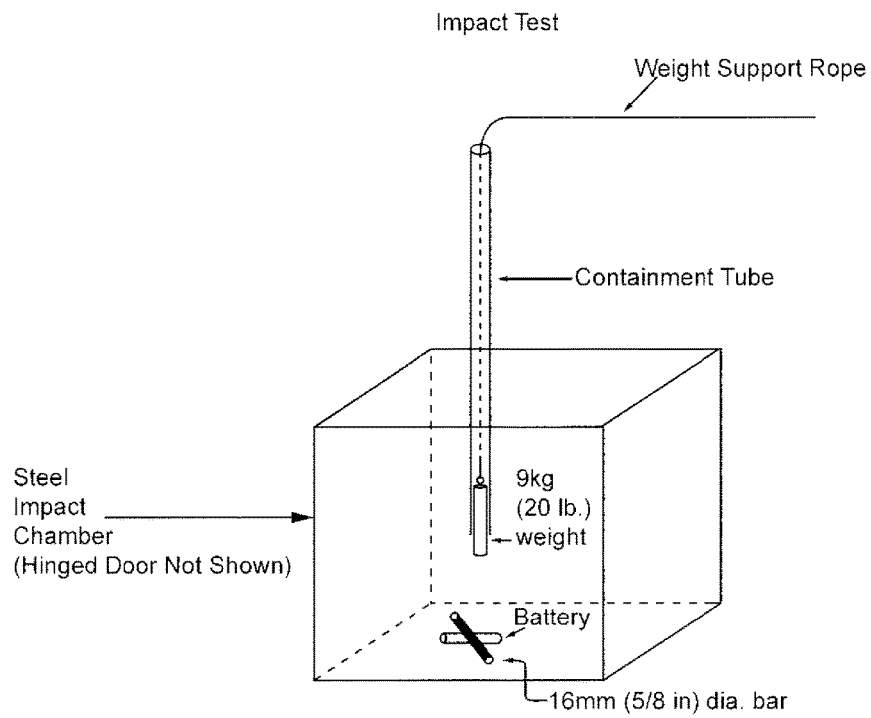
FIG. 12 summarizes the cell impedance and discharge capacities at 1 A, 3 A, 6 A and 10 A and their corresponding ratio of the capacity at 3 A, 6 A or 10 A over that at 1 A for Cell #1 (baseline), #3, #4, #5, and #6. The cell impedance at 1 KHz goes up with the resistive and gas-generator layer. The resistive layer has caused the increase in the cell impedance since all cells with the resistive layer gets higher impedance while the cell discharge capacity depends on the individual case.
FIG. 13 illustrates the Impact Test.
Figures 14, 15:
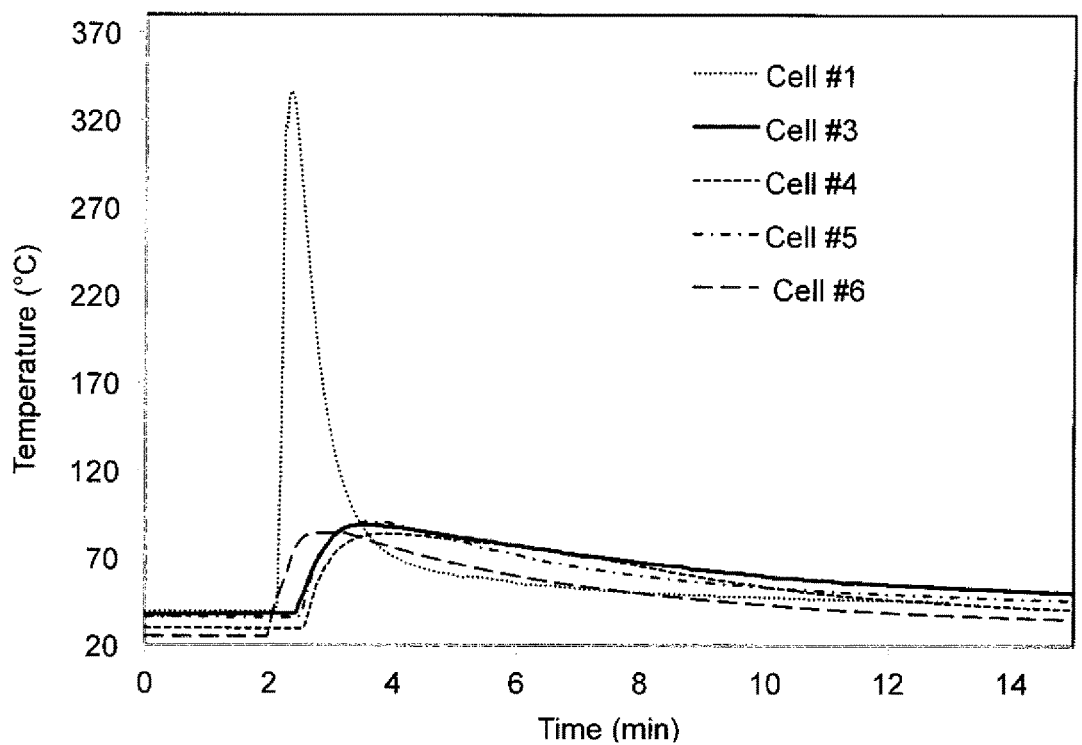
FIG. 14 illustrates the cell temperature profiles during the impact test for Cell #1 (baseline), #3, #5, and #6. The voltage of all tested cells dropped to zero as soon as the steel rod impact the cell. All cells with the resistive and gas-generator layer passed the test while the cell without any resistive layer failed in the test (caught the fire). The maximum cell temperature during the impact test is summarized in FIG. 15.
FIG. 15 summarizes the cell maximum temperature in the impact test for Cell #1 (baseline), #3, #4, #5, and #6.
Figure 16:
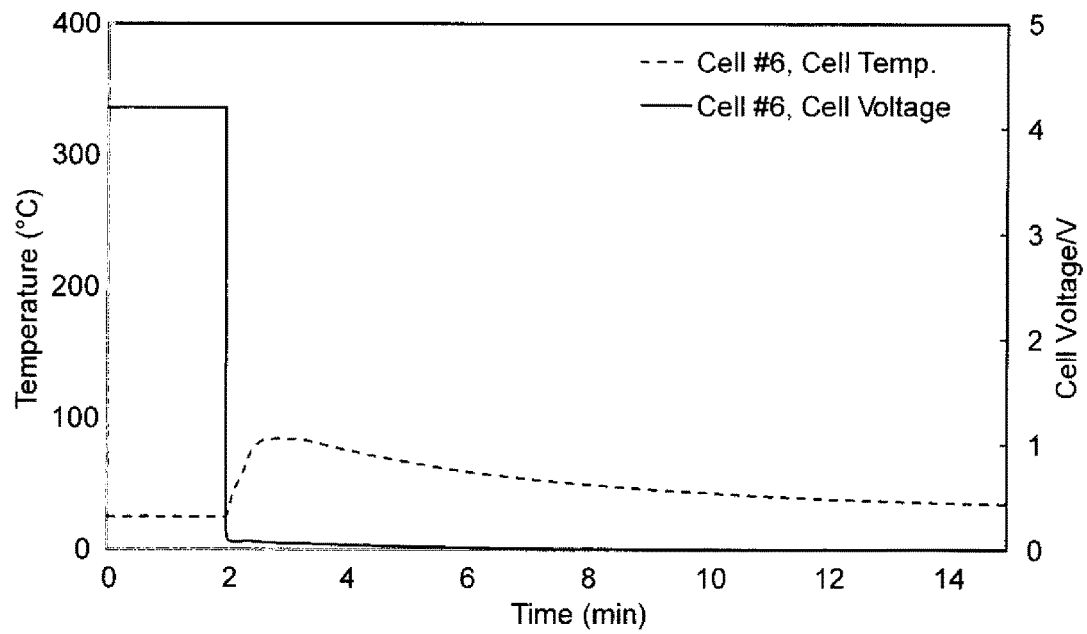
FIG. 16 illustrates the cell voltage and temperature vs the impact testing time for Cell #6. The impact starting time is set to 2 minutes. The cell voltage drop to zero as soon as the cell is impacted. The cell temperature is shown to increase rapidly.
Figure 17:
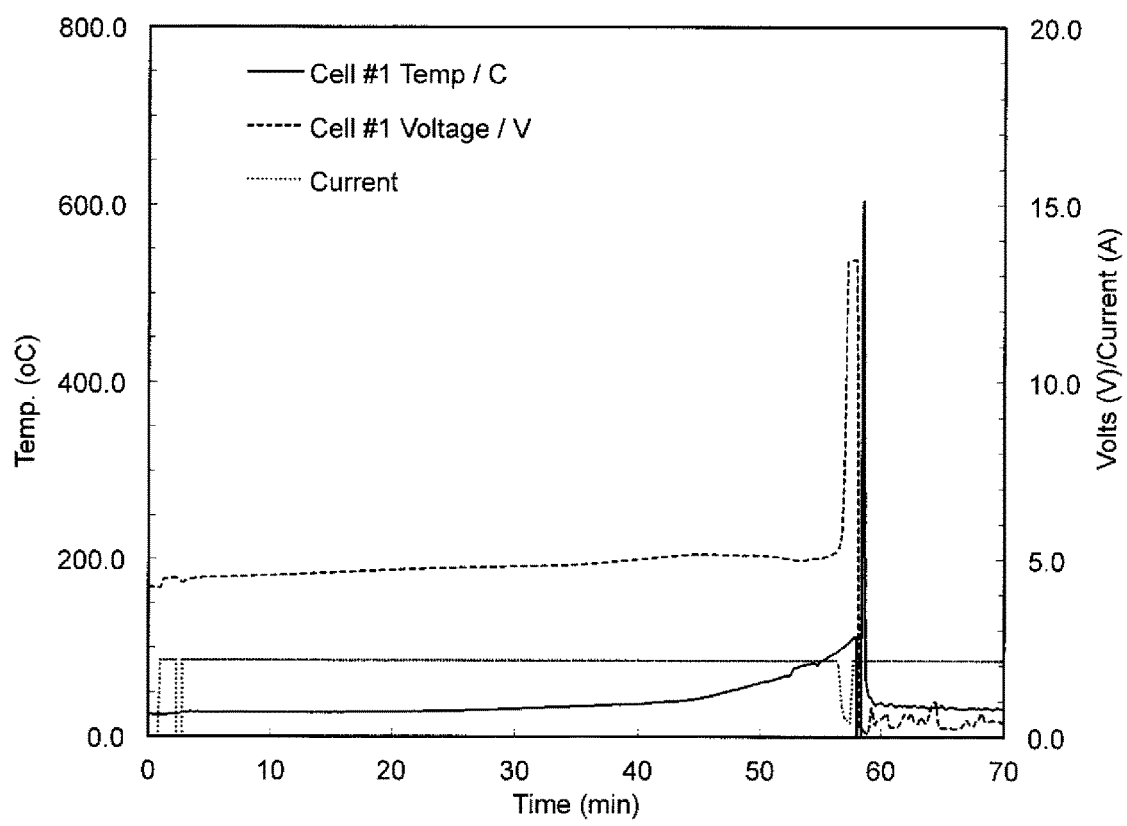
FIG. 17 illustrates the cell voltage and temperature vs the overcharging time for Cell #1 (no any protection layer). The cell voltage increased gradually up to 40 minutes and then decreased slightly and jumped to the maximum charge voltage rapidly at about 56 minutes while at the same time the cell temperature increased dramatically to above 600° C.

FIG. 7 presents the resistance in relation to the temperature increase for the positive electrode collected from autopsying a cell with 3.6 V. The resistance decreases about ten times. FIG. 10 shows the discharge capacity at the discharging currents 1, 3, 6, 10 A. FIG. 12 lists the cell impedance at 1 kHz and the capacity at 1 A, 3 A, 6 A and 10 A currents and the ratio of the capacity at 3, 6, 10 A over that at 1 A. FIG. 14 shows the cell temperature profile during the impact test. FIG. 15 summarizes the cell maximum temperature in the impact test. The cell caught the fire during the impact test. FIG. 17 shows the voltage and temperature profiles of the cells during the 12V/2 A over charge test. The cell caught the fire during the over charge test.

Example 2

Preparation of CaCO$_3$ based gas generator and resistive layer, positive and negative electrodes, and the completed Cell #3 for the evaluation in the resistance measurement, discharge capability tests at 50° C., impact test, over charge, and cycle life test are described below.

A) Positive POS3B as an Example of a Gas Generator and Resistive Layer (1$^{st}$ Layer) Preparation.

i) Torlon® 4000TF (0.8 g) was dissolved into NMP (10 g); ii) PVDF (4.8 g) was dissolved into NMP (~70 g); iii) The solutions prepared in Step i and ii were mixed, and then carbon black (0.32 g) was added and mixed for 10 minutes at 6500 rpm; iv) Nano CaCO$_3$ powder (34.08 g) was added to the solution from Step iii and mixed for 20 minutes at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 1 mg/cm².

B) Preparation of POS3A as an Example of the Positive Electrode Preparation (2$^{nd}$ Layer).

i) PVDF (21.6 g) was dissolved into NMP (250 g); ii) Carbon black (18 g) was added and mixed for 15 minutes at 6500 rpm; iii) LiNiv3C01/3M111/302 (NMC) (560.4 g) was added to the slurry from Step ii and mixed for 30 minutes at 6500 rpm to form a flowable slurry; iv) Some NMP was added for the viscosity adjustment; v) This slurry was coated onto POS3B (Example 2A) using an automatic coating machine with the first heat zone set to about 85° C. and the second heat zone to about 135° C. to evaporate off the NMP. The final dried solid loading was about 19.4 mg/cm². The positive layer was then compressed to a thickness of about 153 μm. The electrode made here was designated as zero voltage against a standard graphite electrode and was used for the impedance measurement at 0 V in relation to the temperature.

C) Preparation of NEG3A as an Example of the Negative Electrode Preparation i) CMC (13 g) was dissolved into deionized water (1000 g); ii) Carbon black (20 g) was added and mixed for 15 minutes at the rate of about 6500 rpm; iii) Negative active graphite (JFE Chemical Corporation; Graphitized Mesophase Carbon Micro Bead (MCMB) and Synthetic Graphite (TIMCAL) (945.92 g in total) were added to the slurry from Step ii and mixed for 30 minutes at 6500 rpm to form a flowable slurry; iv) SBR (solid content 50% suspended in water) (42 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11.8 mg/cm². The negative electrode layer was then compressed to a thickness of about 159 gm. The negative made was used for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat in an aluminum composite bag; v) The bag from Step iv was dried in a 70° C. vacuum oven; vi) The bag from Step v was filled with the LiPF$_6$ containing organic carbonate based electrolyte; vii) The bag from Step vi was sealed; viii) Rest for 16 hours; ix) The cell was charged to 4.2V at C/50 rate for 8 hours and then to 4.2V at 0.5C rate for 2 hours, then rest for 20 minutes, then discharged to 2.8V at 0.5C rate; x) Under vacuum, the cell was punctured to release any gases and then resealed. The cell made here was used for grading and other tests such as discharging capability test at 50° C., impact test, cycle life test and so on.

Figure 8:
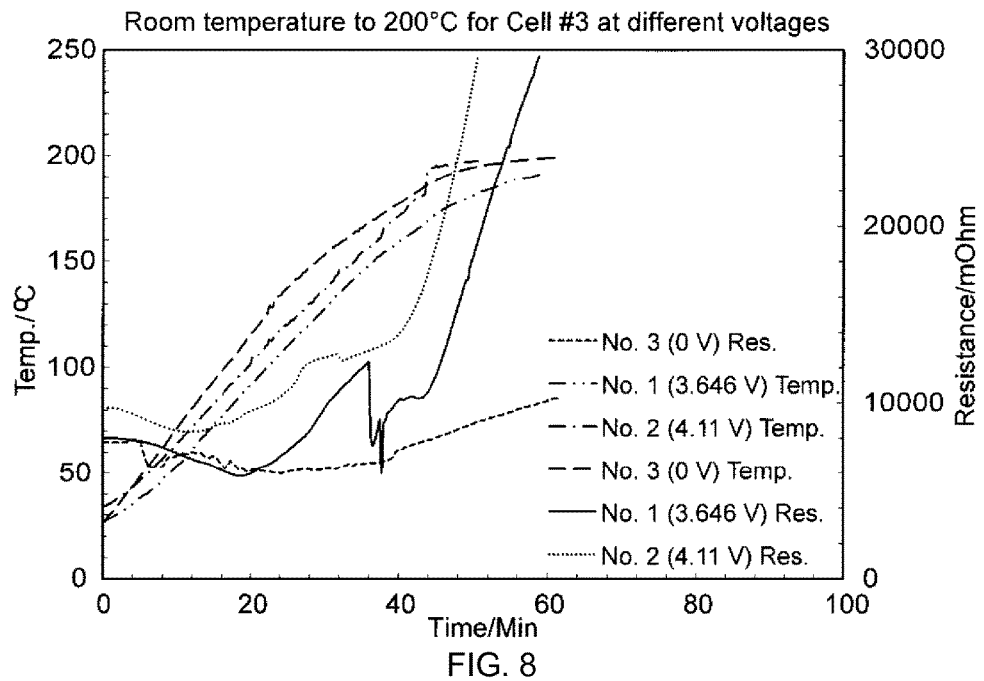
FIG. 8 illustrates the resistance of Cell #3 (positive electrode with the $CaCO_3$ ceramic layer) at 0, 3.646, and 4.11, respectively, voltage vs graphite in relation to the temperature increase. The resistance increases slightly for zero voltage, and dramatically for 3.646 and 4.11 V.
Figure 9:
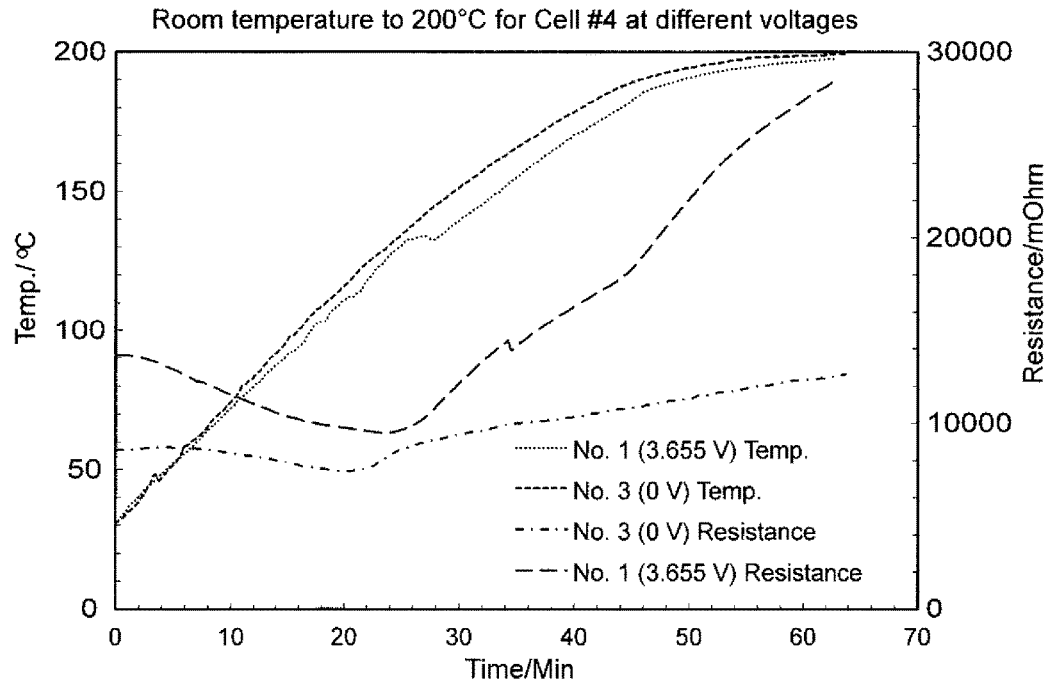
FIG. 9 illustrates the resistance of Cell #4 (positive electrode with the $Al_2O_3$ and $CaCO_3$ ceramic layer) at OV and 3.655V, respectively, voltage vs graphite in relation to the temperature increase. The resistance increases slightly for zero voltage, and dramatically for 3.655 V.
Figure 11:
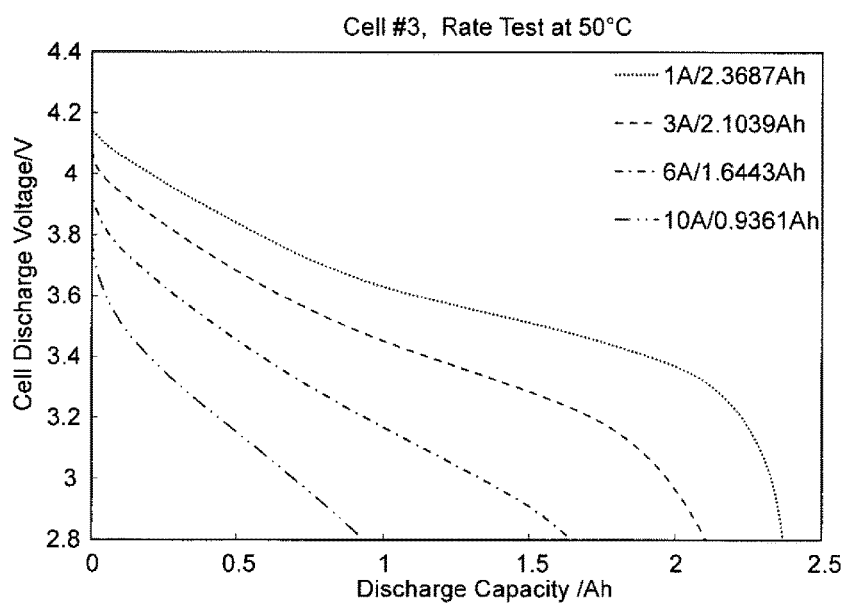
FIG. 11 illustrates the discharge capacity of Cell #3 (85.2% $CaCO_3$ based resistive layer) vs the cell voltage at 1 A, 3 A, 6 A and 10 A. The cell discharge capability decreases significantly with the increase in the cell discharge current with this particular resistive layer.

FIG. 8 presents the resistance in relation to the temperature increase for the positive electrode collected from autopsying cells with 0, 3.6, and 4.09 V. The resistance increases with the increase in the temperature, especially for the positive electrodes obtained from the cell having the voltages 3.66 and 4V. FIG. 11 shows the discharge capacity at 1, 3, and 6 A current and at 50° C. The cell capacity decreases significantly with the increase of the current, indicating the strong effect from the resistive layer. FIG. 12 lists the cell impedance at 1 kHz and the capacity at 1 A, 3 A, 6 A and 10 A currents and the ratio of the capacity at 3, 6, 10 A over that at 1 A. FIG. 18 presents the over charge profiles during the over charge test. FIG. 20 summarize the cell maximum temperature during the over charge test and residual current in the end of over charge test. FIG. 21 shows the discharge capacity vs. the cycle number. The cell lost about 1% capacity that is about 100% better than that (2.5%) of the baseline cell. FIG. 14 shows the cell temperature profiles during the impact test. FIG. 15 summarizes the cell maximum temperature in the impact test.

Example 3

Preparation of 50% $Al_2O_3$ and 50% $CaCO_3$ based gas generator and resistive layer, positive and negative electrodes, and the completed Cell #4 for the evaluation in the resistance measurement, discharge capability tests at 50° C., impact test, over charge and cycle life tests are described below.

A) Positive POS4B as an Example of a Gas Generator and Resistive Layer (1st Layer) Preparation.

i) Torlon® 4000TF (0.8 g) was dissolved into NMP (10 g); ii) PVDF (4.8 g) was dissolved into NMP (~70 g); iii) The solutions prepared in Step i and ii were mixed, and then carbon black (0.32 g) was added and mixed for 10 minutes at 6500 rpm; iv) Nano $CaCO_3$ powder (17.04 g) and $Al_2O_3$ powder (17.04 g) were added to the solution from Step iii and mixed for 20 minutes at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 1 mg/cm².

B) Preparation of POS4A as an Example of the Positive Electrode Preparation ($2^{nd}$ Layer).

i) PVDF (21.6 g) was dissolved into NMP (250 g); ii) Carbon black (18 g) was added and mixed for 15 minutes at the rate of about 6500 rpm; iii) $LiNi_{1/3}CO_{1/3}Mn_{1/3}O_2$ (NMC) (560.4 g) was added to the slurry from Step ii and mixed for 30 minutes at 6500 rpm to form a flowable slurry; iv) Some NMP was added for the viscosity adjustment; v) This slurry was coated onto POS4B (Example 3A) using an automatic coating machine with the first heat zone set to about 85° C. and the second heat zone to about 135° C. to evaporate off the NMP. The final dried solid loading was about 19.4 mg/cm². The positive layer was then compressed to a thickness of about 153 gm. The electrode made here was designated as zero voltage against a standard graphite electrode and was used for the impedance measurement at 0 V in relation to the temperature.

C) Preparation of NEG4A as an Example of the Negative Electrode Preparation i) CMC (13 g) was dissolved into deionized water (~1000 g); ii) Carbon black (20 g) was added and mixed for 15 minutes at 6500 rpm; iii) Negative active graphite (JFE Chemical Corporation; Graphitized Mesophase Carbon Micro Bead (MCMB) and Synthetic Graphite (TIMCAL) (945.92 g in total) were added to the slurry from Step ii and mixed for 30 minutes at 6500 rpm to form a flowable slurry; iv) SBR (solid content 50% suspended in water) (42 g) was added to the slurry formed in Step iii and mixed at about 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11.8 mg/cm². The negative electrode layer was then compressed to a thickness of about 159 μm. The negative made was used for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii was laid flat in an aluminum composite bag; v) The bag from Step iv was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5C rate for 2 hours, then rest for 20 minutes, then discharged to 2.8V at 0.5C rate; x) Under vacuum, the cell was punctured to release any gases and then resealed. The cell made here was used for grading and other tests such as discharging capability test at 50° C., impact test, cycle life test and so on.

FIG. 12 lists the cell impedance at 1 kHz and the capacity at 1 A, 3 A, 6 A and 10 A currents and the ratio of the capacity at 3, 6, and 10 A over that at 1 A. FIG. 14 shows the cell temperature profiles during the impact test. FIG. 15 summarizes the cell maximum temperature in the impact test. FIG. 18 shows the voltage profiles of the cell voltage and temperature during the 12V/2 A over charge test. FIG. 20 summarizes the cell maximum cell temperatures in the over charge test.

Example 4

Preparation of $Al_2O_3$ and Sodium trisilicate ($NaSiO_3$) mixed based gas generator and resistive layer, positive and negative electrodes, and the completed Cell #5 for the evaluation in the resistance measurement, discharge capability tests at 50° C., impact test, over charge, and cycle life tests are described below.

A) Positive POS5B as an Example of a Gas Generator and Resistive Layer (1St Layer) Preparation.

i) Torlon® 4000TF (0.8 g) was dissolved into NMP (~10 g); ii) PVDF (4.8 g) was dissolved into NMP (60 g); iii) The solutions prepared in Step i and ii were mixed, and then carbon black (0.32 g) was added and mixed for 10 minutes at 6500 rpm; iv) Nano $Al_2O_3$ powder (17.04 g) and $NaSiO_3$ (17.04 g) were added to the solution from Step iii and mixed for 20 minutes at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 0.7 mg/cm².

B) Preparation of POS5A as an Example of the Positive Electrode Preparation ($2^{nd}$ Layer).

i) PVDF (21.6 g) was dissolved into NMP (270 g); ii) Carbon black (18 g) was added and mixed for 15 minutes at the rate of about 6500 rpm; iii) $LiNi_{1/3}CO_{1/3}Mn_{1/3}O_2$ (NMC) (560.4 g) was added to the slurry from Step ii and mixed for 30 minutes at the rate of about 6500 rpm to form a flowable slurry; iv) Some NMP was added for the viscosity adjustment; v) This slurry was coated onto POS5B (Example 4A) using an automatic coating machine with the first heat zone set to about 85° C. and the second heat zone to about 135° C. to evaporate off the NMP. The final dried solid loading was about 19.4 mg/cm². The positive layer was then compressed to a thickness of about 153 gm. The electrode made here was designated as zero voltage against a standard graphite electrode and was used for the impedance measurement at 0 V in relation to the temperature.

C) Preparation of NEG5A as an Example of the Negative Electrode Preparation i) CMC (13 g) was dissolved into deionized water (~1000 g); ii) Carbon black (20 g) was added and mixed for 15 minutes at the rate of about 6500 rpm; iii) Negative active graphite (JFE Chemical Corporation; Graphitized Mesophase Carbon Micro Bead (MCMB) and Synthetic Graphite (TIMCAL) (945.92 g in total) were added to the slurry from Step ii and mixed for 30 minutes at 6500 rpm to form a flowable slurry; iv) SBR (solid content 50% suspended in water) (42 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11.8 mg/cm². The negative electrode layer was then compressed to a thickness of about 159 gm. The negative made was used for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat in an aluminum composite bag; v) The bag from Step iv was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5C rate for 2 hours, then rest for 20 minutes, then discharged to 2.8V at 0.5C rate; x) Under vacuum, the cell was punctured to release any gases and then resealed. The cell made here was used for grading and other tests such as discharging capability test at 50° C., impact test, cycle life test and so on.

FIG. 10 lists the cell impedance at 1 kHz and the capacity at 1 A, 3 A, 6 A and 10 A currents and the ratio of the capacity at 3 A, 6 A, and 10 A over that at 1 A. FIG. 14 shows the cell temperature profiles during the impact test FIG. 15 summarizes the cell maximum temperature in the impact test. FIG. 20 summarizes the cell maximum temperature in the 12V/2 A overcharge test.

Example 5

Preparation of 52% $CaCO_3$ and 48% PVDF based gas generator and resistive layer, positive and negative electrodes, and the completed Cell #6 for the evaluation in the resistance measurement, discharge capability tests at 50° C., impact test, over charge, and cycle life tests is described below.

A) Positive POS6B as an Example of a Gas Generator and Resistive Layer (1St Layer) Preparation.

i) PVDF (23.25 g) was dissolved into NMP (~250 g); ii) Carbon black (1.85 g) was added and mixed for 10 minutes at the rate of about 6500 rpm; iv) Nano $CaCO_3$ powder (24.9 g) was added to the solution from Step iii and mixed for 20 minutes at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 1 mg/cm².

B) Preparation of POS6A as an Example of the Positive Electrode Preparation ($2^{nd}$ Layer).

i) PVDF (24 g) was dissolved into NMP (300 g); ii) Carbon black (12 g) was added and mixed for 15 minutes at 6500 rpm; iii) $LiNi^{0.4}CO_{0.3}Mn_{0.4}CO_{0.3}O_2$ (NMC) (558 g) was added to the slurry from Step ii and mixed for 30 minutes at 6500 rpm to form a flowable slurry; iv) Some NMP was added for the viscosity adjustment; v) This slurry was coated onto POS6B (Example 5A) using an automatic coating machine with the first heat zone set to about 85° C. and the second heat zone to about 135° C. to evaporate off the NMP. The final dried solid loading was about 22 mg/cm². The positive layer was then compressed to a thickness of about 167 μm. The electrode made here was designated as zero voltage against a standard graphite electrode and is ready for the impedance measurement at 0 V in relation to the temperature.

C) Preparation of NEG6A as an Example of the Negative Electrode Preparation.

i) CMC (9 g) was dissolved into deionized water (~530 g); ii) Carbon black (12 g) was added and mixed for 15 minutes at 6500 rpm; iii) Negative active graphite (JFE Chemical Corporation; Graphitized Mesophase Carbon Micro Bead (MCMB) (564 g) were added to the slurry from Step ii and mixed for 30 minutes at 6500 rpm to form a flowable slurry; iv) SBR (solid content 50% suspended in water) (30 g) was added to the slurry formed in Step iii and mixed at about 6500 rpm for 5 min; v) Some water was added to adjust the viscosity for a smooth coating; vi) This slurry was coated onto 9 μm thick copper foil using an automatic coating machine with the first heat zone set to about 95° C. and the second heat zone to about 125° C. to evaporate off the water. The final dried solid loading was about 12 mg/cm². The negative electrode layer was then compressed to a thickness of about 170 μm. The negative made was used for the dry for the cell assembly.

D) Preparation of Cell for the Evaluation.

i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The jelly-roll made in the Step iii was laid flat in an aluminum composite bag; v) The bag from Step iv was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5C rate for 2 hours, then rest for 20 minutes, then discharged to 2.8V at 0.5C rate; x) Under vacuum, the cell was punctured to release any gases and then resealed. The cell made here was used for grading and other tests such as discharging capability test at 50° C., impact test, cycle life test and so on.

FIG. 12 lists the cell impedance at 1 kHz and the capacity at 1 A, 3 A, 6 A and 10 A currents and the ratio of the capacity at 3 A, 6 A, 10 A over that at 1 A. FIG. 14 shows the cell temperature profiles during the impact test. FIG. 15 summarizes the cell maximum temperature in the impact test. FIG. 20 summarizes the cell maximum cell temperatures in the over charge test.

Example 6

Preparation of positive electrodes for chemical decomposition voltage measurements is described below.

Preparation of POS7B included the following steps: (i) Deionized water (~300 g) was mixed into Carbopol®-934 (19.64 g); (ii) Super-P® (160 mg) and LiOH (200 mg) were added into the slurry made in Step (i) and mixed for 30 minutes at 5000 rpm; (iii) An appropriate amount of deionized water was added to adjust the slurry to form a coatable slurry. (iv) This slurry was coated onto a 15 μm aluminum foil with an automatic coating machine with the drying temperatures set to 135° C. for zone 1 and 165° C. for zone 2. The final dried solid loading was about 0.7 mg/cm$^2$.

Preparation of POS8B included the following steps: (i) Deionized water (~100 g) was mixed into AI-50 (19.85 g); (ii) Super-P® (160 mg) was added into the slurry made in Step (i) and mixed for 30 minutes at 5000 rpm; (iii) An appropriate amount of deionized water was added to adjust the slurry to form a coatable slurry. (iv) The slurry was coated onto 15 μm aluminum foil with an automatic coating machine with the drying temperatures set to 135 for zone 1 and 165° C. for zone 2. The final dried solid loading was about 0.7 mg/cm$^2$.

Preparation of POS9B included the following steps: (i) Deionized water (~322 g) was mixed into 19.85 g CMC-DN-800H; (ii) Super-P® (160 mg) was added into the slurry made in Step (i) and mixed for 30 minutes at 5000 rpm; (iii) An appropriate amount of deionized water was added to adjust the slurry to form a coatable slurry. (iv) The slurry was coated onto 15 μm Aluminum foil with an automatic coating machine with the drying temperatures set to 135 for zone 1 and 165° C. for zone 2. The final dried solid loading was about 0.7 mg/cm$^2$.

Preparation of POS13B included the following steps: (i) Torlon® 4000TF (400 mg) was dissolved into NMP (4 g). (ii) PVDF-A (2.4 g) was dissolved into NMP (30 g). (iii) The two solutions were mixed and Super-P® (160 mg) was added, then this was mixed for 30 minutes at 5000 rpm. (iv) La$_2$(CO$_3$)$_3$ (17.04 g) were mixed into above slurry and mixed together at 5000 rpm for 30 min. The salts listed in FIG. 6 could be used in place of La$_2$(CO$_3$)$_3$. (v) The slurry was coated onto 15 μm aluminum foil with an automatic coating machine with a first heat zone set to 13° C. and a second heat zone to 16° C. for evaporate off the NMP. Final dried solid loading was about 0.7 mg/cm$^2$.

Example 7

Electrochemical test for the positives electrodes coated with gas generator layers is described below.

The decomposition voltages of all resistive layers were measured with three electrodes configuration (resistive layer as the working electrode, and lithium metal as both reference electrode and count electrode) by Linear Sweep Voltammetry technology using VMP2 multichannel potentiostat instrument at the room temperature. A 0.3 cm×2.0 cm piece of the resistive layer as the working electrode, and 0.3 cm×2.0 cm piece of lithium metal as both reference electrode and count electrode were put into a glass containing LiPF$_6$ ethylene carbonate based electrolyte (5 g). The scan rate is 5 mV/second in the voltage range from 0 to 6V. FIGS. 23 and 25 shows the decomposition voltage profiles of these compounds. FIGS. 24 and 26 summarizes the peak current and peak voltage for each of the compounds tested. Implementations of the current subject matter can include, but are not limited to, articles of manufacture (e.g. apparatuses, systems, etc.), methods of making or use, compositions of matter, or the like consistent with the descriptions provided herein.

Example 8

Preparation of CaCO$_3$ based gas generator layer, positive and negative electrodes, and the cell (#7) for the evaluation in the over charge test is described below.

A) Positive POS071A as an Example of a Gas Generator Layer (1$^{st}$ Layer) Preparation.

i) Torlon® 4000TF (0.9 g) was dissolved into NMP (10 g); ii) PVDF (5.25 g) was dissolved into NMP (~68 g); iii) The solutions prepared in Step i and ii were mixed, and then carbon black (1.8 g) was added and mixed for 10 min at the rate of about 6500 rpm; iv) Nano CaCO$_3$ powder (7.11 g) and 134.94 g LiNi$_{0.33}$Mn$_{0.33}$Co$_{0.33}$O$_2$ were added to the solution from Step iii and mixed for 20 min at the rate of about 6500 rpm to form a flowable slurry; v) This slurry was coated onto 15 μm thick aluminum foil using an automatic coating machine with the first heat zone set to about 90° C. and the second heat zone to about 140° C. to evaporate off the NMP. The final dried solid loading was about 4 mg/cm$^2$.

B) Preparation of POS071B as an Example of the Positive Electrode Preparation (2nd Layer).

i) PVDF (25.2 g) was dissolved into NMP (327 g); ii) Carbon black (21 g) was added and mixed for 15 min at the rate of about 6500 rpm; iii) LiNi$_{0.82}$Al$_{0.03}$Co$_{0.15}$O$_2$ (NCA) (649 g) was added to the slurry from Step ii and mixed for 30 min at the rate of about 6500 rpm to form a flowable slurry; iv) Some NMP was added for the viscosity adjustment; v) This slurry was coated onto POS071A using an automatic coating machine with the first heat zone set to about 85° C. and the second heat zone to about 135° C. to evaporate off the NMP. The final dried solid loading is about 20.4 mg/cm$^2$. The positive layer was then compressed to a thickness of about 155 μm.

C) Preparation of NEG015B as an Example of the Negative Electrode Preparation i) CMC (15 g) was dissolved into deionized water (~951 g); ii) Carbon black (15 g) was added and mixed for 15 min at the rate of about 6500 rpm; iii) Negative active graphite (JFE Chemical Corporation; Graphitized Mesophase Carbon Micro Bead (MCMB) (945 g) was added to the slurry from Step ii and mixed for 30 min at the rate of about 6500 rpm to form a flowable slurry; iv) SBR (solid content 50% suspended in water) (50 g) was added to the slurry formed in Step iii and mixed at about 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11 mg/cm$^2$. The negative electrode layer was then compressed to a thickness of about 155 μm. The negative made is ready for the dry for the cell assembly.

D) Preparation of Cell for the Evaluation i) The electrodes were punched into the pieces with an electrode tab; ii) The positive electrode was dried at ~125° C. for 10 hr and negative electrode at ~140° C. for 10 hr; iii) The positive and negative electrodes were laminated with the separator as the middle layer; iv) The jelly-roll made in the Step iii was laid flat in an aluminum composite bag; v) The bag from Step iv. was dried in a 70° C. vaccum oven; vi) The bag from Step v was filled with the $LiPF_6$ carbonate based electrolyte; vii) The bag from Step vi was sealed; viii) Rest for 16 hours; ix) The cell was charged to 4.2V at C/50 rate for 8 hours and then to 4.2V at 0.5C rate for 2 hours, then rest for 20 minutes, then discharged to 2.8V at 0.5C rate. The cell made here was used for grading and other tests such as over charge test.

FIG. 27 presents the overcharge voltage, cell temperature and oven chamber temperature during the overcharge test (2 A and 12V). The cell passed the over test nicely since the cell maximum temperature is about 83° C. during the overcharge test. Implementations of the current subject matter can include, but are not limited to, articles of manufacture (e.g. apparatuses, systems, etc.), methods of making or use, compositions of matter, or the like consistent with the descriptions provided herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A battery, comprising:
   an anode energy layer;
   a cathode energy layer;
   a separator interposed between the anode energy layer and the cathode energy layer;
   an anode current collector configured to transfer electrons to and/or from the anode energy layer; and
   an interrupt layer interposed between the anode energy layer and the anode current collector, the interrupt layer comprising a voltage sensitive material configured to delaminate the interrupt layer from the anode current collector by at least decomposing upon exposure to a voltage in excess of a maximum safe voltage for the battery, the decomposition of the voltage sensitive material generating a gas that causes the delamination of the interrupt layer from the anode current collector, and the delamination of the interrupt layer from the anode current collector interrupting a current flow through the anode current collector.

2. The battery of claim 1, wherein the voltage sensitive material is porous and comprises:
   a ceramic powder defining an interstitial space;
   a binder for partially filling the interstitial space for binding the ceramic powder; and
   a conductive component dispersed within the binder for imparting conductivity to the interrupt layer, the interstitial space remaining partially unfilled for imparting porosity and permeability to the interrupt layer.

3. The battery of claim 2, wherein the voltage sensitive material is compacted for reducing the unfilled interstitial space and increasing the binding of the ceramic powder by the binder.

4. The battery of claim 2, wherein the voltage sensitive material comprises greater than 30% ceramic powder by weight.

5. The battery of claim 2, wherein the voltage sensitive material comprises greater than 50% ceramic powder by weight.

6. The battery of claim 2, wherein the voltage sensitive material comprises greater than 70% ceramic powder by weight.

7. The battery of claim 2, wherein the voltage sensitive material comprises greater than 75% ceramic powder by weight.

8. The battery of claim 2, wherein the voltage sensitive material comprises greater than 80% ceramic powder by weight.

9. The battery of claim 2, wherein the voltage sensitive material is permeable for transporting ionic charge carriers.

10. The battery of claim 1, wherein the voltage sensitive material is non-porous and comprises:
    a non-conductive filler;
    a binder for binding the non-conductive filler; and
    a conductive component dispersed within the binder for imparting conductivity to the interrupt layer.

11. The battery of claim 10, wherein the voltage sensitive material is impermeable to transport of ionic charge carriers.

12. The battery of claim 1, wherein the voltage sensitive material is sacrificial at voltages above the maximum safe voltage.

13. The battery of claim 12, wherein the voltage sensitive material includes a ceramic powder that chemically decomposes above the maximum safe voltage, and wherein the decomposition of the ceramic powder generates the gas.

14. The battery of claim 13, wherein the gas is fire retardant.

15. The battery of claim 1, wherein the decomposition of the voltage sensitive material transitions the interrupt layer from an unactivated state to an activated state, wherein the interrupt layer is laminated to the anode current collector when the interrupt layer is in the unactivated stated, and wherein the interrupt layer is delaminated from the anode current collector when the interrupt layer is in the activated state.

16. A method for interrupting a recharging process for a battery having a maximum safe voltage and comprising an anode energy layer, a cathode energy layer, a separator interposed between the anode energy layer and the cathode energy layer, and an anode current collector configured to transfer electrons to and/or from the anode energy layer, the method comprising:

delaminating, upon exposure to a voltage above the maximum safe voltage, an interrupt layer interposed between the anode energy layer and the anode current collector, the interrupt layer being delaminated from the anode current collector to at least interrupt a current flow through the anode current collector, the interrupt layer being delaminated by a decomposition of a voltage sensitive material comprising the interrupt layer, the decomposition of the voltage sensitive material generating a gas that causes the delamination of the interrupt layer from the anode current collector.

17. The method of claim 16, wherein the decomposition of the voltage sensitive material transitions the interrupt layer from an unactivated state to an activated state, wherein the interrupt layer is laminated to the anode current collector when the interrupt layer is in the unactivated stated, and wherein the interrupt layer is delaminated from the anode current collector when the interrupt layer is in the activated state.

* * * * *